US011816691B2

(12) United States Patent
Nelsen et al.

(10) Patent No.: US 11,816,691 B2
(45) Date of Patent: *Nov. 14, 2023

(54) DISTRIBUTION OF FRACTIONAL EQUITY REWARDS BASED ON PURCHASE BEHAVIOR

(71) Applicant: Apex Fintech Solutions Inc., New York, NY (US)

(72) Inventors: David Nelsen, Lake Oswego, OR (US); Philip Bryan Hagen, Portland, OR (US); Jeffrey Press, Portland, OR (US); Aaron Wirick, Portland, OR (US); Cameron Knight, Portland, OR (US); Jason Zeiber, Scappoose, OR (US)

(73) Assignee: APEX FINTECH SOLUTIONS INC., New York, NY (US)

(*) Notice: Subject to any disclaimer, the term of this patent is extended or adjusted under 35 U.S.C. 154(b) by 115 days.

This patent is subject to a terminal disclaimer.

(21) Appl. No.: 17/444,472

(22) Filed: Aug. 4, 2021

(65) Prior Publication Data

US 2021/0365975 A1 Nov. 25, 2021

Related U.S. Application Data

(63) Continuation of application No. 16/537,476, filed on Aug. 9, 2019, now Pat. No. 11,113,709.

(Continued)

(51) Int. Cl.
 *G06Q 30/02* (2023.01)
 *G06Q 30/0207* (2023.01)
 (Continued)

(52) U.S. Cl.
 CPC ..... *G06Q 30/0216* (2013.01); *G06Q 30/0226* (2013.01); *G06Q 40/06* (2013.01)

(58) Field of Classification Search
 None
 See application file for complete search history.

(56) References Cited

U.S. PATENT DOCUMENTS

| 6,345,261 | B1 | 2/2002 | Feidelson et al. |
| 6,615,188 | B1 * | 9/2003 | Breen ............. G06Q 40/06 |
| | | | 705/37 |

(Continued)

FOREIGN PATENT DOCUMENTS

| WO | 0106438 A1 | 1/2001 |
| WO | 0131529 A1 | 5/2001 |
| WO | 02065246 A2 | 8/2002 |

OTHER PUBLICATIONS

Nelsen, D., "Determining Equity Rewards Based Upon Purchase Behavior," U.S. Appl. No. 62/543,884, filed Aug. 10, 2017, 91 pages.

(Continued)

*Primary Examiner* — David J Stoltenberg
(74) *Attorney, Agent, or Firm* — McCoy Russell LLP

(57) ABSTRACT

Herein disclosed are systems and methods for distributing fractional equity rewards to users of a loyalty platform based on tracked user loyalty purchases. The disclosed systems and methods may reduce time between a user loyalty purchase and distribution of a fractional equity reward determined based on the user loyalty purchase. In one example, by maintaining a pre-purchased supply of shares within an inventory account of the loyalty platform, and by distributing fractional equity rewards to user accounts on the loyalty platform from the pre-purchased supply, a reduction in reward distribution time may be enabled. Further, by maintaining the pre-purchased supply of shares of stock within the inventory based on a running average rate of fractional equity reward distribution, and predicted events, the amount of stock in the inventory may be intelligently (Continued)

controlled to reduce excess inventory, while reducing a probability of reward distribution delay.

18 Claims, 7 Drawing Sheets

Related U.S. Application Data

(60) Provisional application No. 62/717,736, filed on Aug. 10, 2018.

(51) Int. Cl.
  *G06Q 40/06* (2012.01)
  *G06Q 30/0226* (2023.01)

(56) References Cited

U.S. PATENT DOCUMENTS

| | | | |
|---|---|---|---|
| 6,895,386 | B1 | 5/2005 | Bachman et al. |
| 7,249,075 | B1* | 7/2007 | Altomare ............... G06Q 40/00 |
| | | | 705/35 |
| 10,565,608 | B1 | 2/2020 | Isaacson et al. |
| 2002/0042742 | A1 | 4/2002 | Glover et al. |
| 2002/0046110 | A1 | 4/2002 | Gallagher |
| 2002/0052818 | A1 | 5/2002 | Loveland |
| 2002/0072969 | A1 | 6/2002 | Fisher et al. |
| 2002/0116264 | A1 | 8/2002 | Feidelson et al. |
| 2003/0004803 | A1 | 1/2003 | Glover et al. |
| 2003/0004809 | A1 | 1/2003 | Palcic et al. |
| 2003/0208397 | A1 | 11/2003 | VanDusen |
| 2004/0210505 | A1 | 10/2004 | Pourhamid |
| 2007/0208624 | A1 | 9/2007 | Gallagher |
| 2007/0250454 | A1* | 10/2007 | Bloom ................... G06Q 40/04 |
| | | | 705/36 R |
| 2007/0265950 | A1* | 11/2007 | Reuss .................... G06Q 40/00 |
| | | | 705/36 R |
| 2008/0201230 | A1 | 8/2008 | Hardison |
| 2009/0198632 | A1* | 8/2009 | Dillahunty ............. G06Q 40/06 |
| | | | 705/36 R |
| 2009/0319423 | A1 | 12/2009 | Kersenbrock |
| 2012/0203608 | A1 | 8/2012 | Lele et al. |
| 2014/0156495 | A1* | 6/2014 | Al-Saadi ................ G06Q 40/06 |
| | | | 705/37 |
| 2015/0095132 | A1 | 4/2015 | Van Heerden et al. |
| 2015/0100519 | A1 | 4/2015 | Globe et al. |
| 2016/0078542 | A1 | 3/2016 | Sanders |
| 2017/0140411 | A1* | 5/2017 | Lele ....................... G06Q 40/04 |
| 2018/0225759 | A1* | 8/2018 | van Stolk .......... G06Q 30/0601 |
| 2020/0051113 | A1 | 2/2020 | Nelsen et al. |
| 2020/0286116 | A1 | 9/2020 | Hazelton et al. |

OTHER PUBLICATIONS

Nelsen, D., "Distributing Success Linked Rewards to Customers of Privately Held Companies," U.S. Appl. No. 62/697,284, filed Jul. 12, 2018, 80 pages.

ISA Korean Intellectual Property Office, International Search Report and Written Opinion Issued in Application No. PCT/US2019/046051, dated Dec. 13, 2019, WIPO, 12 pages.

* cited by examiner

600

700

DISTRIBUTION OF FRACTIONAL EQUITY REWARDS BASED ON PURCHASE BEHAVIOR

CROSS REFERENCE TO RELATED APPLICATIONS

The present application is a continuation of U.S. patent application Ser. No. 16/537,476, entitled "DISTRIBUTION OF FRACTIONAL EQUITY REWARDS BASED ON PURCHASE BEHAVIOR," and filed on Aug. 9, 2019. The U.S. patent application Ser. No. 16/537,476 claims priority to U.S. Provisional Patent Application No. 62/717,736, entitled "DISTRIBUTION OF FRACTIONAL EQUITY REWARDS BASED ON PURCHASE BEHAVIOR," filed on Aug. 10, 2018. The entire contents of the above-identified applications are hereby incorporated by reference for all purposes.

FIELD

The present application relates to systems and methods for distributing fractional equity rewards to users of a loyalty platform based on purchase behavior.

BACKGROUND AND SUMMARY

Conventional reward programs, such as mail-in rebates or reward points based programs, suffer because they fail to build user loyalty with a particular company in the long term. One reason for this failure is that one-time rewards, like a rebate or a physical prize awarded after redeeming a certain number of accumulated points, do little to align the interests of the user with the interests of the rewarding company beyond a certain limited time frame. Another factor limiting the success of conventional reward programs to generate user loyalty is the effort required on the part of the user to record and/or submit proof of purchases which may be eligible for a reward, such as when a user is required to enter a code or other proof of purchase into an online account in order to receive credit/points for the purchase, or when a proof of purchase must be mailed-in in order to receive a rebate. Additionally, in points based rewards programs, accrued points often come with an expiration date or date when the points must be redeemed by, thereby placing an additional burden on the user to hurriedly redeem their points and further exacerbating the inability of such programs to maintain user loyalty over the long term. Points frequently have no real value outside the scope of a rewards program and, as such, mean little to customers in the grand scheme of their financial picture. Furthermore, rewards programs often have unrealistic goals requiring many dollars spent and points earned in order to earn a small reward.

One approach to increase customer loyalty over the long term is to reward customers with shares of stock in the businesses they patronize. As shares of stock held by customers may establish a meaningful long term relationship between customers and brands, rewarding customers with an equity reward, as opposed to a cash award, enables greater longer term loyalty and alignment of interests between customers and brands. However, as shares of stock are conventionally bought and sold on the open market as whole shares (that is, in positive integer amounts), and as the price for a single share of stock in a business may be substantial (for example, the price of Amazon stock at the time of writing is $1,829/share), it may be unrealistic to reward a customer purchase with a whole share of stock, such as when a purchase amount is relatively small (especially in comparison to a share price associated with the transacting business/brand). As such, the potential of equity reward programs to generate customer loyalty has remained unrealized and there is a recognized need to provide a method for rewarding customers with fractional shares of stock.

Conventional methods aimed at addressing these issues teach providing fractional shares of stock as awards to customers who engage in promotional activity, wherein the fractional shares of stock may be transferred to the customer from an inventory containing a supply of whole shares of stock. In one example, when a customer is eligible to receive a $5 award based on engagement in a promotional activity with a business, that $5 award may be in the form of $5 worth of stock in that business, which may take the form of a fractional share of stock and may be allocated to the customer from a supply of whole shares of stock stored in an inventory of the award provider. Further, a supply of shares of stock in the inventory of the award provider may increase based on the amount of fractional shares of stock held by all customers, such that the amount of shares of stock in the inventory account is equal to or greater than the cumulative amount of shares of stock held by all customers.

The inventors herein have identified several issues with the conventional approach illustrated above. In one example, the above method teaches maintaining an inventory of whole shares of stock (for providing fractional equity awards) which is equal to or greater than an aggregate number of publicly traded shares of stock held by the customers. Such a method of inventory control requires increasing the amount of stock held in the inventory as the total amount of stock held by customers increases, which may result in a large number of shares of stock being held in the inventory with a correspondingly large financial risk assumed by the award provider. In addition to the inefficiencies of the above illustrated method for controlling the amount of shares of stock within the inventory, a further issue identified by the inventors is the lack of feedback provided to customers regarding earned awards, which may result in the customers feeling frustrated and uncertain regarding a timing of award distribution. Additionally, conventional approaches for rewarding customers with fractional shares of equity, such as that illustrated above, fail to account for the dynamic nature of customer behavior, which may result in large fluctuations in the rate and amount of customer reward accrual. This may result in the amount of shares of stock within the inventory account being excessive, resulting in underutilized capital (as well as increased financial risk to the provider based on holding positions for an extended duration), or an insufficient amount of shares within the inventory account, resulting in delayed customer rewards as new shares may need to be purchased from the market before a customer may receive a reward.

The inventors herein have developed systems and methods which may enable enhanced efficiency of distribution of fractional equity rewards to users with a reduced probability of reward delay, a more efficient method of controlling the supply of equity within an inventory account, and reduced user frustration owing to uncertainty regarding when earned rewards will be distributed. In a first example, a method comprising: aggregating a plurality of dollar reward amounts, wherein the plurality of dollar reward amounts are based on a plurality of tracked user loyalty purchases; displaying an equity reward status to one or more user computing devices associated with one or more of the plurality of tracked user loyalty purchases; executing a whole share purchase based on the aggregated dollar reward amounts exceeding a pending reward threshold; determining a plurality of fractional share amounts based on an execution price of the whole share purchase and the plurality of dollar reward amounts; distributing the plurality of fractional share amounts to a plurality of user accounts from a pre-purchased supply of shares in an inventory account of a loyalty platform; and displaying an updated equity reward status to the one or more user computing devices.

In this way, fractional shares of stock may be distributed to users in a timely manner based on tracked user loyalty purchases using a loyalty platform, while reducing risk associated with maintaining a large inventory of stock (wherein the risk may include a financial risk associated with holding equity), and while informing users of the status of their pending fractional equity rewards, thereby reducing user frustrations associated with potential reward delays. As an example, by distributing the plurality of fractional share amounts to a plurality of user accounts from a pre-purchased supply of shares in an inventory account, of a loyalty platform, a reward may be rapidly distributed to a user based on an automatically tracked user loyalty purchase. In another example, by providing the user with an equity reward status, which may comprise a graphical user interface displaying an amount of fractional shares earned as a reward for a user loyalty purchase, along with an estimated reward fulfillment time for the reward, user behavior may be more effectively incentivized via the fractional equity reward.

In a second example, the pre-purchased supply of shares in the inventory account of the loyalty platform may be maintained based on an upper supply threshold and a lower supply threshold, wherein the upper supply threshold and the lower supply threshold are determined based on a running average rate of fractional equity rewards distributed to user accounts from the inventory account, and the upper supply threshold and the lower supply threshold are adjusted based on a predicted event, such as an upcoming holiday, sale, promotional event, or other event which may influence the rate of accrual of pending fractional equity rewards by users of the loyalty platform. In this way, the pre-purchased supply of shares in the inventory account may be dynamically adjusted such that a sufficient amount of pre-purchased shares of stock are available to satisfy pending fractional equity rewards, while reducing the probability of an unnecessarily large supply of equity being held within the inventory account, which may result in added financial risk, or regulatory burden.

The above summary is provided to introduce a selection of concepts in a simplified form that are further described below in the Detailed Description. This summary is not intended to identify key features or essential features of the subject matter, nor is it intended to be used to limit the scope of the subject matter. Furthermore, the subject matter is not limited to implementations that solve any or all of the disadvantages noted above or in any part of this disclosure.

DETAILED DESCRIPTION

Figure 1A:
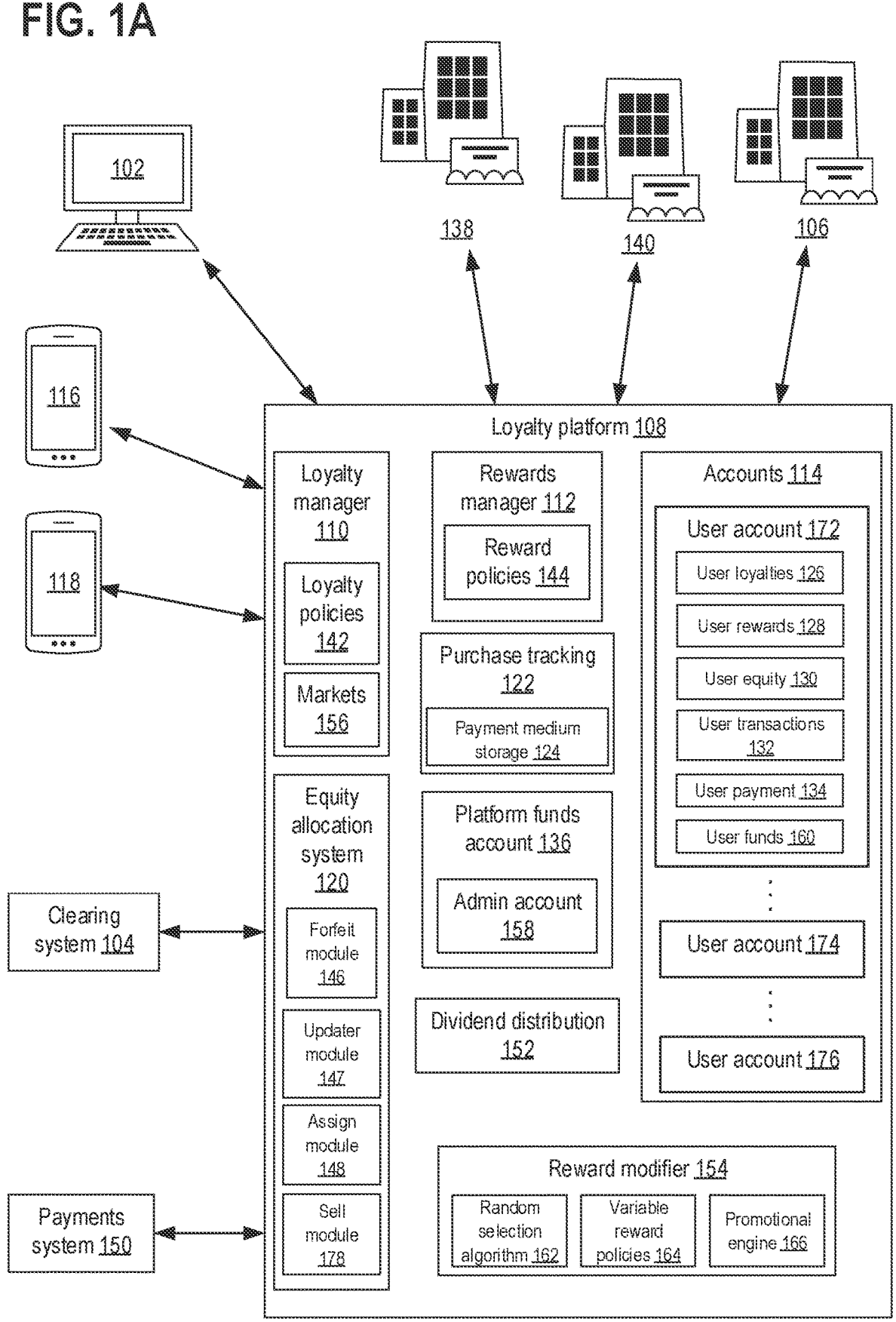
FIG. 1A shows an example of a loyalty platform.

The following description relates to systems and methods for a loyalty platform providing fractional equity rewards to users based on tracked user loyalty purchases (the term "user" or "users" is herein used interchangeably with the terms "customer" or "customers"). Examples of a loyalty platform and related features are disclosed in U.S. Provisional Patent Application No. 62/697,284, entitled "DISTRIBUTING SUCCESS-LINKED REWARDS TO CUSTOMERS OF PRIVATELY HELD COMPANIES," filed on Jul. 12, 2018, and U.S. Provisional Patent Application No. 62/543,884, entitled "DETERMINING EQUITY REWARDS BASED UPON PURCHASE BEHAVIOR", filed on Aug. 10, 2017. The entire contents of each of the above-identified applications are hereby incorporated by reference for all purposes. The fractional equity rewards may comprise amounts of fractional shares of stock. As used herein, the terms fractional equity rewards, fractional shares of stock, fractional equity, fractional shares, fractional amounts of stock, fractional amounts of an Exchange Traded Fund (ETF), and similar terms shall be used interchangeably, and shall be understood to refer to positive, non-zero, non-integer amounts of shares of stock. For example, the term fractional shares of stock may refer to amounts of stock such as 1.2 shares, 0.00040 shares, 0.017397 shares, 23.7 shares, and irrational amounts of shares of stock such as pi shares, or e shares. In some examples the stock may be publicly traded, while in other examples the stock may be non-publicly traded. The fractional equity reward may be provided to a user by the loyalty platform based on a tracked user loyalty purchase made at a business, wherein the business has a Merchant Agreement with the loyalty platform to provide loyalty customers of said business with rewards of equity on behalf of the business, and wherein a user loyalty purchase may comprise a purchase made by a user at a business to which the user has made a loyalty selection. As an example, the loyalty platform may have an agreement with a business, Coffee Company (a made up business for use as an example, we shall refer to the stock in Coffee Company as CC) to reward loyalty customers of Coffee Company with fractional shares of CC stock based on purchases made by these loyalty customers. The term loyalty customer(s) as used herein (with reference to a business, company, or brand) refers to customers who have made an exclusionary loyalty selection to a brand (in this example, to the Coffee Company), wherein the loyalty selection may exclude the customer from receiving rewards from competing brands (competing brands may comprise brands offering similar products, or brands which operate in a same market, wherein a market is a brand category defined by the loyalty platform). As an example, Coffee Company may reward loyalty customers with fractional shares of CC stock in an amount of 2% of a monetary value of customer purchases, based on a customer with a loyalty selection to Coffee Company conducting a purchase at Coffee Company with a monetary value of $50.00, that customer may be eligible to receive $1.00 worth of CC stock via the loyalty platform. With a current share price of CC stock being $52.15/share, the loyalty customer in the above example may receive a fractional share of CC in the amount of 0.01917 shares CC.

Figure 4:
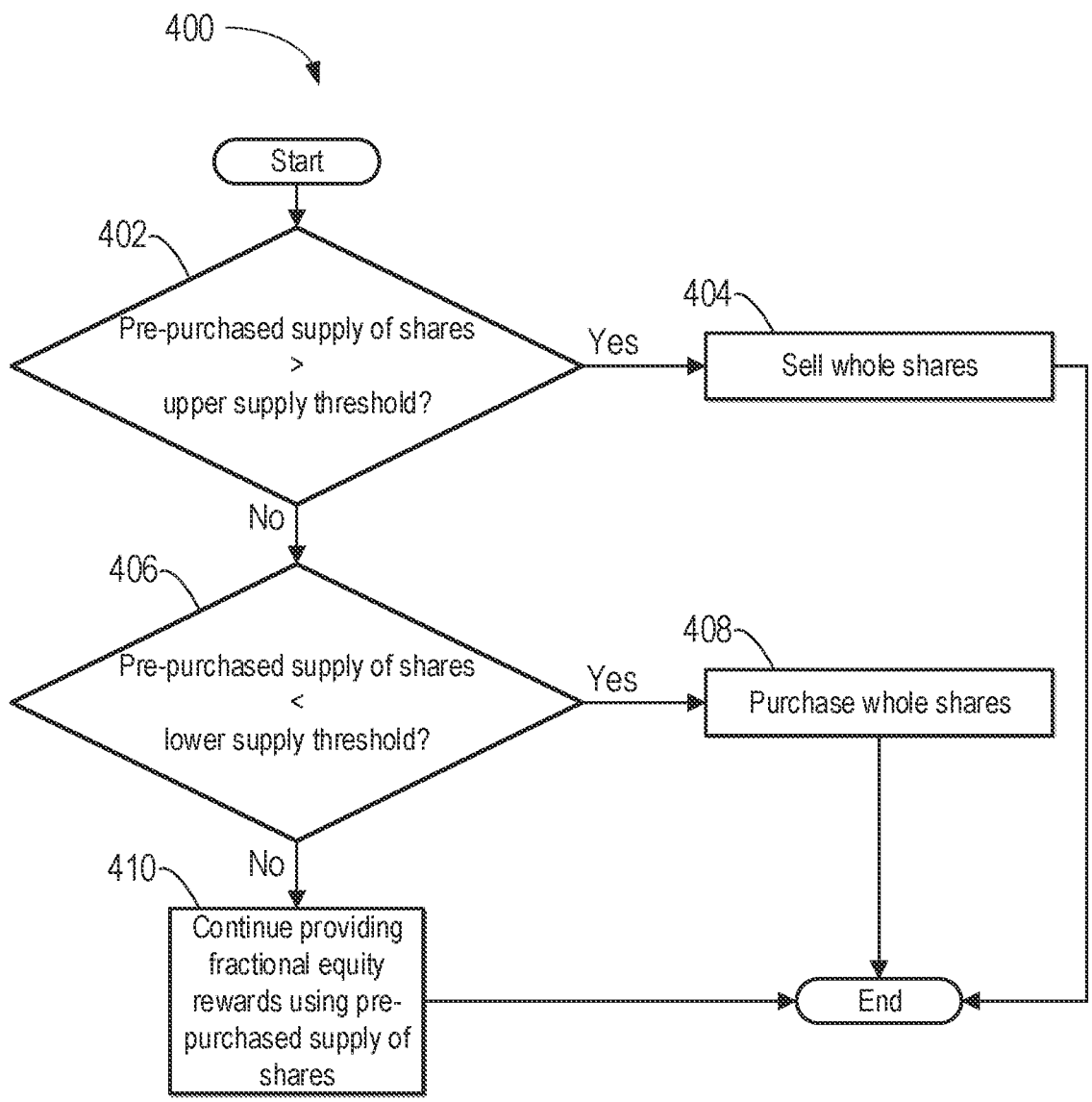
FIG. 4 shows a high level flowchart of a method for dynamically controlling the pre-purchased supply of shares within an inventory account of the loyalty platform.
Figure 5:
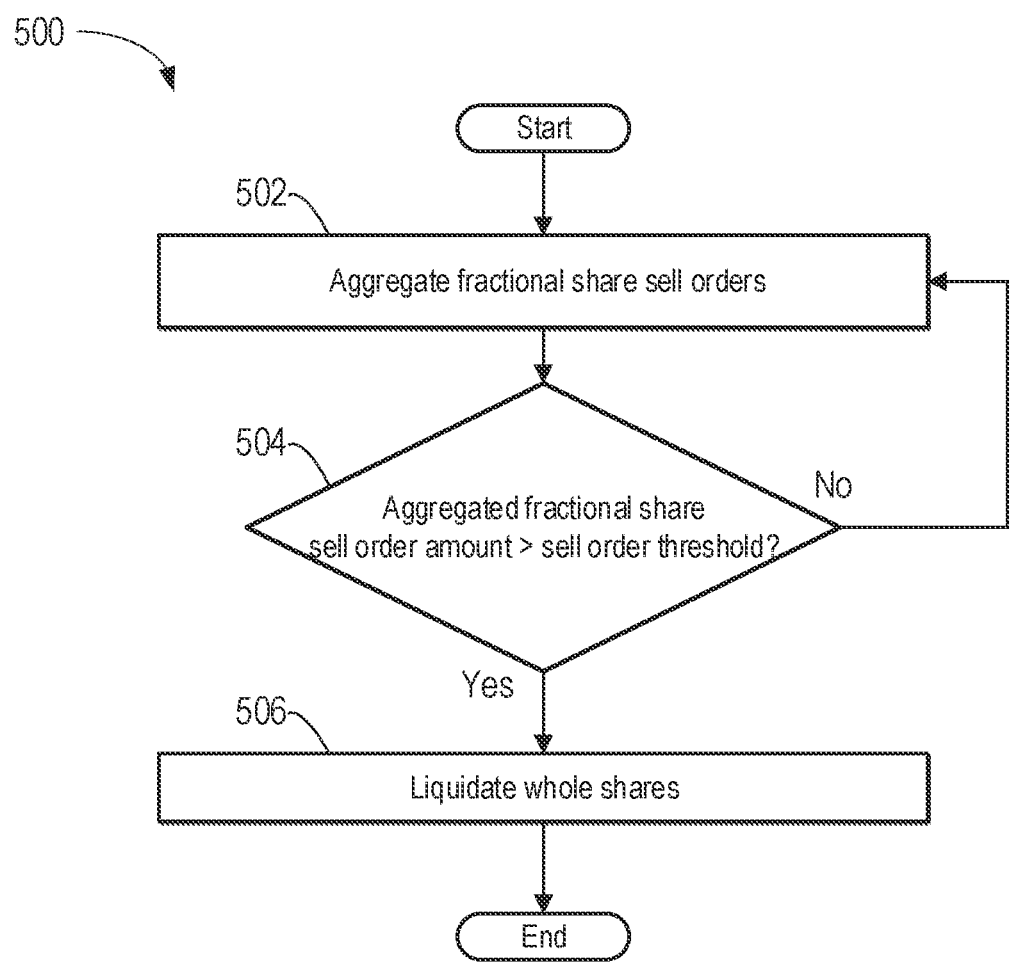
FIG. 5 shows a high level flowchart of a method for aggregating and executing user fractional equity sell orders.
Figure 6:
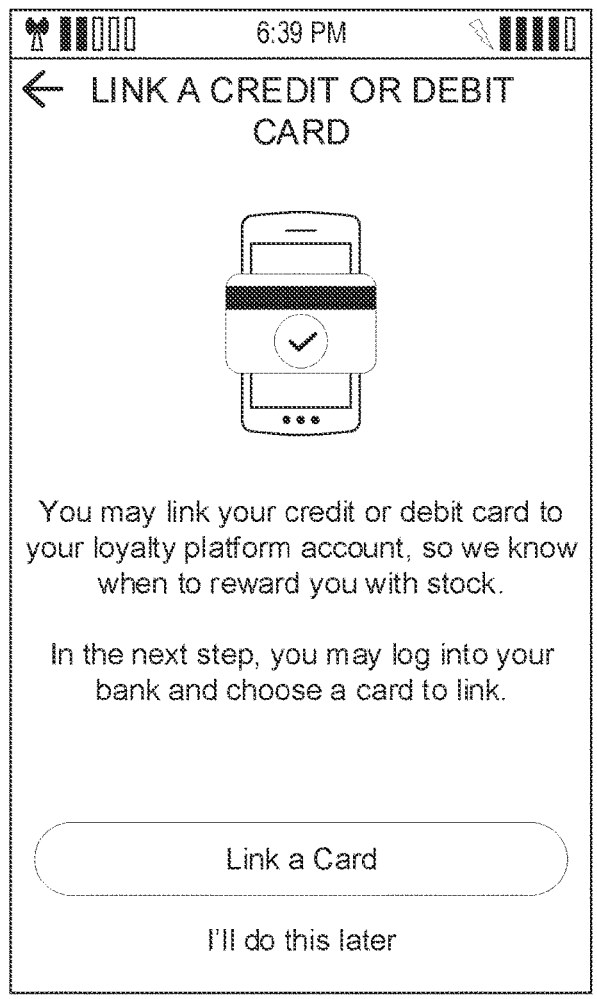
FIG. 6 shows an example graphical user interfaces for linking payment media.
Figure 7:
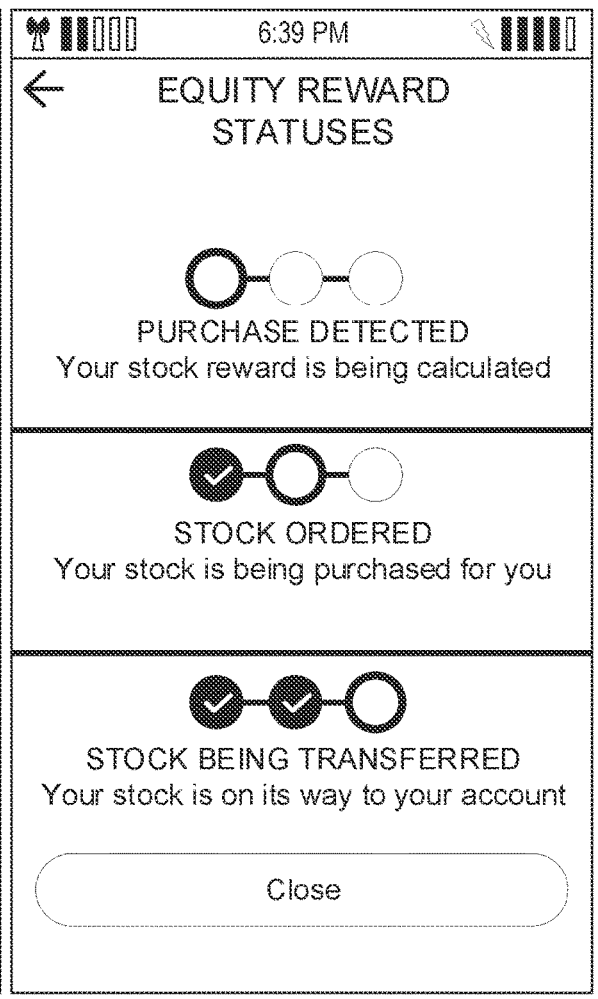
FIG. 7 shows a graphical user interface displaying exemplary equity reward statuses for tracked user loyalty purchases.

The following description provides examples of systems and methods which may enable a loyalty platform, such as loyalty platform 108 shown in FIG. 1A, to distribute fractional equity rewards to users while reducing a probability of reward distribution delay, reducing a probability of an inventory having either an excess or paucity of shares of stock for user rewards, and reducing user frustration by providing equity reward statuses and estimated reward fulfilment times for fractional equity rewards. The loyalty platform may be implemented by one or more computing systems, such as computing system 180 shown in FIG. 1B. Computing system 180 may include non-transitory memory, which may include instructions that when executed carry out one or more steps of one or more of the methods herein disclosed, such as methods 300, 400, and 500 discussed in detail below. It will be understood that loyalty platforms, such as loyalty platform 108, may be implemented by more than one computing system, such as in a distributed computing scheme, wherein various functionalities of the loyalty platform may be enabled by a plurality of networked computing systems working in concert. Loyalty platform 108 may comprise an equity allocation system, such as equity allocation system 120 shown in FIG. 2, which may distribute fractional shares of stock to users based on tracked user loyalty purchases according to a method, such as method 300 shown in FIG. 3. FIG. 4 shows one example of a method by which an inventory account of a loyalty platform, such as inventory accounts within inventory accounts 250, may dynamically adjust a pre-purchased supply of shares held therein, by liquidating/selling whole shares of the pre-purchased supply, or by purchasing whole shares of stock from the open market to be added to the pre-purchased supply, based on an upper supply threshold and a lower supply threshold. By dynamically adjusting the pre-purchased supply of shares held within an inventory account, such as by implementing method 400, a probability of reward distribution delay may be reduced, while maintaining a relatively small amount of pre-purchased shares of stock. FIG. 5 shows one example method by which an equity allocation system of a loyalty platform may enable users to place sell orders for part, or all, of their accumulated fractional equity rewards. FIG. 6 illustrates an example graphical user interfaces which may be rendered by a display of a user computing device as part of a process of linking a payment medium to a user account on a loyalty platform, while FIG. 7 illustrates an example of an equity reward status, which may be displayed to a user via a display of a user computing device, as part of one or more methods for distributing fractional equity rewards.

In one example of a method for distributing fractional shares of stock to a user according to the current disclosure, a user of the loyalty platform may make a purchase at a participating business to which the user has made a loyalty selection (such as a business listed in rewarding-business index 186 discussed in detail below) using a linked payment medium (such as a linked payment card). Once the payment settles between a payment card company and the participating business, a dollar reward amount is determined by the loyalty platform (for example, based on a 1% reward rate, a $100 purchase made by a user to a participating business may be eligible for a $1 reward of stock in the participating business, thus the dollar reward amount is $1 and the fractional equity reward will be a function of the dollar reward amount and a current market price of the stock to be purchased). Once a dollar reward amount is determined for a given purchase, an equity reward status may be displayed to a user, indicating the current status of the pending fractional equity reward, which may comprise the dollar reward amount, a stock to be purchased in an amount proportional to the dollar reward amount (the fractional equity reward), and an estimated reward fulfillment time for the fractional equity reward. The dollar reward amount to be rewarded to the user may be aggregated with other pending dollar reward amounts accrued by other users of the loyalty platform to form an aggregated dollar reward amount. As an example, pending dollar reward amounts from a plurality of users may be aggregated until the aggregated pending dollar reward amount exceeds a pending reward threshold. A whole share buy order may then be entered in an average price account of the loyalty platform based on the aggregated pending dollar reward amount. For example, if the aggregated pending dollar reward amount is equivalent to 0.8 shares of stock X at the current market price for stock X (specifically, if the aggregated pending dollar reward amount equals $8, and the current market price for stock X is $10), a whole share buy order of the closest whole share amount which is greater than the fractional share equivalent of the aggregated pending dollar reward amount may be executed, in this case, a buy order for 1.0 shares of stock X may be placed, at an execution price of $10/share. The buy order may be executed via an average price account. Once the buy order is fulfilled/executed through a whole share transaction on the open market through a clearing system (such as through the NYSE), the execution price (that is, the price at which the buy order was filled), may be used to convert the aggregated dollar reward amounts into an aggregated fractional equity reward amounts. For example, if in the above example, a user had a pending dollar reward amount of $2 worth of stock X, and a whole share purchase (as given in the example above) for 1.0 shares of stock X at an execution price of $10/share, that user's pending dollar reward amount may entitle the user in this case to a 0.20 shares of stock X. The 0.20 shares of stock X in this example represents the pending fractional equity reward for the user based on the pending dollar reward amount previously discussed. Correspondingly, according to the above example, an aggregated pending dollar reward amount equal to $8, may be equivalent to a pending fractional equity reward of 0.80 shares of stock X.

Upon execution of the whole share purchase, and based on the aggregated dollar reward amounts, fractional shares of stock from a pre-purchased supply of stock within an inventory account of the loyalty platform may be apportioned to a plurality of user accounts to satisfy the aggregated pending dollar reward amount. For example, the inventory account may distribute 0.8 shares of stock X from a pre-purchased supply of shares of stock X by allocating 0.6 shares of stock X to user A, and 0.2 shares of stock X to user B, based on user A having a pending fractional equity reward of 0.6 shares of stock X and user B having a pending fractional equity reward of 0.2 shares of stock X. Upon distribution of the fractional equity rewards to the plurality of user accounts associated with the plurality of users, an updated equity reward status may be displayed to the plurality of users, indicating that the pending fractional equity reward has been distributed. The updated equity reward status may be unique to each user, and may indicate the specific fractional equity reward received by an account of each user. The purchased number of whole shares may arrive later, to replenish the amount of shares used to satisfy the pending fractional equity rewards, that is, the 1.0 whole shares of stock X purchased may be transferred to the inventory account to replenish the 0.8 shares of stock X used to satisfy the aggregated pending fractional equity rewards. In this way, user reward distribution may occur before settlement of a whole share purchase, which may increase speed of fractional equity reward distribution.

Although in the above example the users receive two equity reward statuses, it is within the scope of the disclosure to send any number of equity reward statuses, which may be sent at any time during the process of aggregating, acquiring, and distributing, rewards. For example, equity reward statuses may be displayed to a user via a display of a user computing device upon determination of a dollar reward amount, upon determination of the fractional equity reward based on the dollar reward amount, upon aggregation of the pending dollar reward amount with other pending dollar reward amounts, and upon crediting of the user account with the fractional equity reward corresponding to the dollar reward amount. Each of the fractional equity reward statuses may comprise different information and each equity reward status may further contain an updated estimated reward fulfillment time.

The funds used the average price account to buy the number of whole shares may be transferred to the average price account from a merchant bank account, or other payment account. Equity acquired by the average price account may be allocated to other accounts, such as an inventory account, within a threshold duration of time, such that the balance of equity within the average price account after a duration may be zero. For example, the process of allocating the portion of the whole shares of stock to the inventory account may be completed within 24 hours, such that the average price account does not hold positions in equity for more than a 24 hour period.

The inventory account may comprise a plurality of accounts, each associated with a unique business providing rewards to users via a loyalty platform. Alternatively, the inventory account may comprise a single account which may be configured to hold shares of stock for a plurality of businesses providing rewards to users via the loyalty platform. Each business may have an associated pre-purchased supply of shares for providing fractional equity rewards to users based on tracked user loyalty purchases. Each pre-purchased supply of shares may be dynamically adjusted, that is the amount of the pre-purchased supply of shares may be dynamically controlled, by buying and selling/liquidating whole shares of stock on the open market, to add or subtract from the pre-purchased supply. Funds for acquiring the shares of stock comprising the pre-purchased supply of shares may originate from a business associated with the inventory account. The upper supply threshold and lower supply threshold for a given inventory account associated with a business, may be based on historical data, as well as on extrapolations of data. For example, the upper supply threshold and lower supply threshold may be based on a running average rate of reward accrual. For example, based on a rate of reward accrual for stock X, of 10 shares/day, an upper supply threshold and lower supply threshold may be determined. The upper and lower supply thresholds may be adjusted as the running average rate of reward accrual changes. Further, the upper and lower supply threshold may be adjusted based on predicted events which may impact a rate of reward accrual, such as a holiday, a sale, or other promotional offer or foreseeable event which may influence a rate of purchases made with a business, and therefore which may influence a rate of reward accrual and distribution.

The loyalty platform may provide a notice to a participating business indicating an amount of funds needed to replenish a pre-purchased supply of shares in an inventory account associated with the business. "Replenish", as used herein with reference to a pre-purchased supply of shares within an inventory may refer to maintaining the pre-purchased supply of shares above a lower supply threshold of the inventory account. In one example, a lower supply threshold be determined as an amount of shares of stock corresponding to three days worth of fractional equity rewards for that business, such as may be determined using a rolling average rate of fractional equity reward distribution for a given business. The participating business may, based on the provided notice, direct its bank to transfer via ACH this dollar amount to the loyalty platform.

FIG. 1A schematically shows an example loyalty platform 108. Loyalty platform 108 may be implemented by one or more computing systems. In one example, loyalty platform 108 may be implemented by a server. In another example, loyalty platform 108 may be implemented by a plurality of computing systems working in concert, such as through a network connection, wherein each of the plurality of computing systems may implement part of the loyalty platform 108. Loyalty platform 108 may be configured to electronically communicate with external computing systems, such as user computing systems 102, 116, and 118, businesses 106, 138, and 140, clearing system 104, and payments system 150. In one example, loyalty platform 108 may be configured to electronically communicate with one or more additional computing systems via a network such as the Internet, wherein the electronic communication may in one example comprise transmission and reception of data between the loyalty platform 108 an one or more additional computing systems.

User computing devices 102, 116, 118, which may interface with loyalty platform 108 via a network connection, may each be associated with at least one user and further associated with at least one user account stored in non-transitory memory of one or more a computing systems implementing loyalty platform 108. As an example, use of the term "user" or "prospective user" or may refer to any legal entity, whether individual or corporate. Each user computing device may be associated with a user and thus enable the user to communicate with loyalty platform 108. In one example, user computing devices 102, 116, 118 may be associated with user accounts 172, 174, 176 and may be any associated corporation or associated individual. Users associated with user computing devices 102, 116, and 118 may register with loyalty platform 108 and make user purchases at a plurality of businesses, such as businesses 138, 140, 106. Based upon user loyalty selections, wherein a loyalty selection may comprise a selection of an exclusionary loyalty to one business in a market, the user may be entitled to a fractional equity reward upon executing a user loyalty purchase (a purchase between a user and a business with which the user has made a loyalty selection).

Additionally, the user may be excluded from receiving rewards from unselected businesses based on the loyalty selection. In one example, upon distribution of the fractional equity reward to a user account, such as user account 172 within user accounts 114 on loyalty platform 108, the loyalty platform 108 may transmit an equity reward status via network connection to the user computing device to display information pertaining to a pending fractional equity reward (as used herein, the terms pending fractional equity reward, and pending reward, refer to a fractional share of stock to which a user is entitled based on a user loyalty purchase, but which has not yet been distributed to the user). In one example, an equity reward status, such as that illustrated in FIG. 7, may indicate a current stage or state of reward distribution for a pending fractional equity reward or for a plurality of pending fractional equity rewards. In another example, an equity reward status may include an estimated reward fulfillment time for a pending fractional equity reward, such as an expected date by which the pending fractional equity reward may be distributed to the user account or an estimated duration of time until one or more stages or steps of the reward distribution process are completed (for example, a stage or step of the reward distribution process may comprise one or more of calculating the fractional equity reward, aggregating the fractional equity reward, purchasing the fractional equity reward, and distributing the fractional equity reward to the user account).

User computing devices 102, 116, 118 may each include a processor, memory, communication interface, display, user input devices, GPS/position sensors, and/or other components. In one example, a location of user computing device 116 may be determined via a GPS system associated therewith. In one example, information from loyalty platform 108 may be transmitted to user computing device 118 via a network connection (such as the Internet) between user computing device 118 and loyalty platform 108, for rendering within an interface or display implemented at user computing device 116. The display may be used to present a visual representation of the loyalty platform 108. This visual representation may take the form of a graphical user interface (GUI), examples of which are illustrated in FIGS. 6 and 7. The communication interface may communicatively couple the loyalty platform 108 with one or more other computing systems, such as the payments system 150, clearing system 104, user computing devices, and/or business computing devices. The communication interface may include wired and/or wireless communication devices compatible with one or more different communication protocols. As non-limiting examples, the communication interface may be configured for communication via a wireless telephone network, or a wired or wireless local- or wide-area network. User input device(s) may comprise one or more user-input devices such as a keyboard, mouse, touch screen, or game controller.

Clearing system 104 may comprise one or more computing devices each including a processor, memory, communication interface, and/or other components. The memory of the computing device(s) of clearing system 104 includes instructions or rules for managing a clearing house for assignment of public shares. As a further example, clearing system 104 may comprise a clearing house for assignment of non-public shares. Clearing system 104 may communicate with equity allocation system 120 of loyalty platform 108 in order to execute transactions such as the buying or selling of shares, or fractional shares, via average price account 260 of the equity allocation system 120.

Payments system 150 may comprise one or more computing devices each including a processor, memory, communication interface, network adapter, user input device(s), and/or other components. The memory of the computing device(s) of payments system 150 includes instructions or rules for disbursing and/or receiving payments via one or more banks, bank accounts, credit card accounts, checking accounts, online payments systems, or virtual wallets. In some examples, payments system 150 may include discrete accounts, each of which may be associated with a user account 172, 174, 176 of accounts 114 on the loyalty platform 108.

Businesses 138, 140, and 106 may be any merchant, business place, brand, bank, financial institution, entrepreneur or entrepreneurial entity associated with loyalty platform 108. As an example, use of the term "business" or "merchant" or "brand" may contemplate any stock corporation, whether private or public. Each business may communicate with loyalty platform 108, for example, via a business computing device. Each user computing device may include a processor, memory storing instructions executable by the processor, display, user input devices, and a communication interface.

Figure 1B:
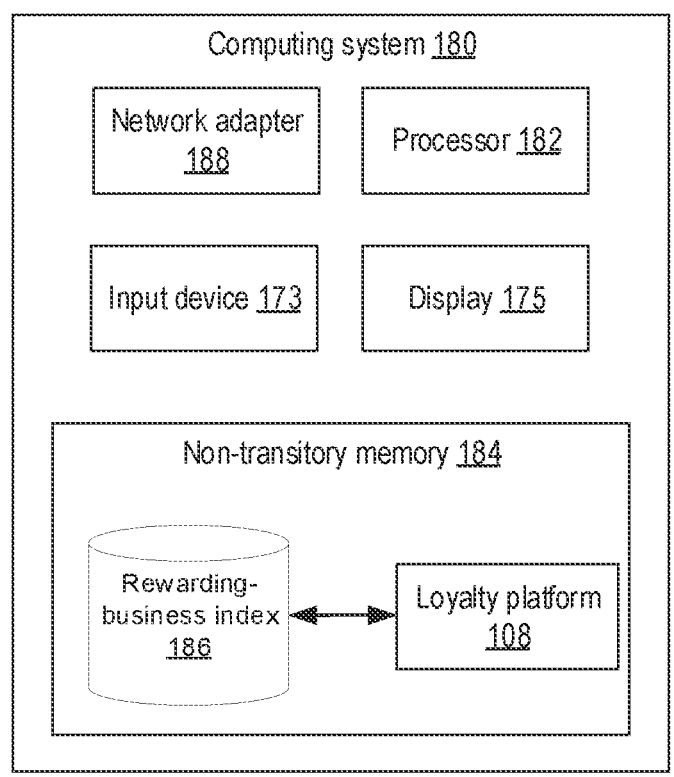
FIG. 1B shows an example of a computing system implementing the loyalty platform.

Any of the computing devices, modules, or elements described herein with reference to FIG. 1A and FIG. 1B may communicate with each other via a network. For example, loyalty platform 108 may communicate with clearing system 104 and payments system 150 via a network.

Loyalty platform 108 may include a plurality of modules including a loyalty manager 110, rewards manager 112, accounts 114, equity allocation system 120, purchase tracking 122, platform account 136, dividend distribution 152, and reward modifier 154. As illustrated in exemplary FIG. 1B, the various modules of the loyalty platform 108 may include instructions stored in non-transitory memory 184 that are executable by processor 182 of computing system 180. In other examples, the modules may be stored on multiple memories and/or executed by multiple processors distributed across multiple computing devices connected by a network.

Loyalty manager 110 administers loyalty policies 142 and updates user loyalties 126 of accounts 114 with updated loyalty policies relating to businesses to which a user may make a loyalty selection. Loyalty manager 110 includes loyalty policies 142 and markets 156. Markets 156 may be a database or module which may further represent suitable information regarding categorization of businesses affiliated with loyalty platform 108 into discrete markets or business segments wherein the businesses segmented into different markets compete in some way or offer similar products and/or services additionally/alternatively, such information may be stored in rewarding business index 186 shown in FIG. 1B. Loyalty manager 110 may represent suitable information regarding loyalty selections of the loyalty platform 108. As a non-limiting example, loyalty manager 110 may include market definitions for a market such as "Groceries (National)." In some examples, businesses not affiliated and/or businesses pending affiliation or partnership with the platform may be listed in the markets database. In an example, businesses listed in the markets database may have different statuses such as "non-partner" (if not partnered with the platform), "partner" (if partnered with the platform), and "pending partner" (if partnership with the platform is pending). Business statuses in the markets 156 may be useful as they may allow users to be made aware of businesses which may or may not become platform partners over time, which may factor into a user's decision to make a loyalty selection to a particular business in a market. In one example, a "Groceries (National)" market might include large, nation-wide grocery chains, not limited to, for example, COSTCO, ALBERTSON'S, DOLLAR GENERAL, KROGER. In an example, a market may include any number of businesses and there may be any number of markets included in markets 156. In an example, market definitions may be defined by administrators of the platform account 136.

Additionally, loyalty manager 110 may include loyalty policies 142 which may further include instructions or information relating to managing loyalties across markets 156 of loyalty platform 108. Separating businesses into individual markets is not so simple, as many business and/or merchants exist not only in one market, but are diversified and compete in many different markets. For example, a massive big-box store such as WALMART sells not only groceries, but also home goods, including electronics, prescription medications, and clothing. As such, loyalty manager 110 may further include loyalty policies 142 that limit the loyalty selections for a user across different markets, so that a user may only select loyalty to a particular business across different markets (of markets 156) a particular number of times. In an example, a user may be allowed to select loyalty to only one business for a single market. In another example, a user may be allowed to select a first loyalty to a business in a first market and to select a second loyalty to the business in a second market. In a further example, a user may be allowed to select loyalty to a business as many times as allowed by loyalty policies 142 across different markets, if the business is "multi-listed" or offered as a loyalty selection across different markets. In a further example, a user may be allowed to select loyalty to one or more businesses listed within a market.

Further, in some examples, loyalty manager 110 may process loyalty switches of the user. In one example a user may elect to switch-loyalties after receiving a loyalty-review from the loyalty platform. In one example, a "loyalty review" may display to a user a purchase history, along with an indication of which purchases received loyalty rewards, which purchases did not receive loyalty rewards, and which purchases could have received a greater amount of loyalty rewards if a loyalty-switch was made. For example, the loyalty platform may display a "loyalty review" button within a user interface on a display of a user device, upon selection of the "loyalty review" button by the consumer, a purchase history in the grocery category (as used herein, a category of the loyalty platform is equivalent to a market of the loyalty platform) may be displayed in the user interface, wherein the purchase history may indicate that the user was spending 40% (of the total spent in the grocery category of the loyalty platform) over the last 3 months at Kroger, and 60% at Albertson's, but their loyalty is to Kroger. Based on the information displayed to the user by the loyalty review, the user may elect to switch loyalties from Kroger to Albertson's. In one example, the loyalty review may include automatically prompting a user with a loyalty-switch offer upon a determination that the user spends more with a business in a market to which the user is not currently loyal than the user spends with a business to which the user is currently loyal. In response to a user selecting a loyalty switch offer, loyalty manager 110 may update user loyalties associated with an account of a user, such as user loyalties 126 of user account 172.

Rewards manager 112 may be a module or database and may include reward policies 144 which may further include instructions or information comprising rules for providing fractional equity rewards based upon a user's selected loyalty to a transacting business (business with which transaction occurs). Additionally, reward policies 144, in an example, may include specific rule sets regarding equity rewards for a user executing purchases at or with a particular business (herein referred to as business reward policies) to which the user has selected loyalty via the loyalty platform. As an example, a user's long-term loyalty may be rewarded with increased equity rewards. In some examples, equity rewards may increase over time while in other examples, equity rewards may randomly and/or predictably vary over time. In some examples, variable, increasing, and/or long-term loyalty rewards may form stronger user-business relationships and user loyalty. Additionally, if a user switches loyalties from a first company in a first market to a second company in the first market, a promotional "loyalty-switch offer" may be made available to the user. In an example, a "loyalty-switch offer" may comprise a period of increased equity rewards per transaction with the business. For example, a "loyalty-switch offer" might also comprise any of a cash reward, discounted purchases, a set amount of equity, or any other loyalty-switch promotion desired by the administrators of the loyalty platform. As a further example, administrator account 158 or platform account 136 may modify reward policies 144 of rewards manager 112.

Accounts 114 may be a module or database including instructions, information, and/or rules relating to personal and loyalty platform information for each user 102, 116, 118 associated with the loyalty platform 108. As an example, users 102, 116, and 118 may register with loyalty platform 108 via a smartphone, computer, point-of-sale unit at businesses 106, 138, 140, or other network-enabled computing device in order to build and create user accounts 172, 174, 176 associated with (as an example) users 102, 116, and 118, respectively, the accounts being stored in accounts 114. As an example, accounts 114 may include user information for each user, including user loyalties 126, user rewards 128, accumulated user equity 130, user transactions 132, user payments 134 (including, in some examples, payment preferences, methods, or payment media), and user funds 160.

User equity 130 may include equity currently assigned to a user, such as fractional shares of stock. In one example, user equity 130 may comprise a brokerage account maintained by clearing system 104, wherein the clearing system 104 acts as the custodian of individual user equity accounts. Loyalty platform 108 may receive up-to-date information regarding user equity accounts maintained by clearing system 104, enabling the loyalty platform 108 to inform a user of the current amount of accumulated equity rewards. Further, loyalty platform 108 may communicate with clearing system 104 to conduct buys, sells, trades, or other transactions on behalf of the user. In another example, the loyalty platform 108 may maintain an omnibus account with clearing system 104, and the loyalty platform 108 may further create individual brokerage accounts/user equity accounts, such as user equity 130, maintained within the loyalty platform itself. In this example, the loyalty platform may use the omnibus account to purchase allotments of equities, which may then be journaled/distributed to individual user equity accounts to satisfy pending equity rewards.

User loyalties 126 may include the businesses and/or brands to which the user has made a loyalty selection in a defined market, and which may be displayed to a user via a graphical user interface. User rewards 128 of a user's account may include the rewards for which the user is currently eligible based on user loyalty purchases, such as when making a transaction using payment media registered (or linked) with purchase tracking 122. As used herein, payment media, or a payment medium, may refer to credit cards, debit cards, virtual wallets, or other devices capable of conducting electronic transactions, which are associated with a payment account, such as a checking account. User transactions 132 may include a history of tracked user purchases executed by a user using one or more linked payment media and tracked by loyalty platform 108 via purchase tracking 122. User payment 134 may include user preferences for payment or a virtual wallet held by the loyalty platform 108. User funds 160 may include electronic funds stored for a user which may be used for purchases made via the platform or, as an example, user funds 160 may include funds received via dividend payments from dividend distribution 152. As an example, accounts 114 may be updated continuously, via communication between rewards manager 112, loyalty manager 110, purchase tracking 122, equity allocation system 120, dividend distribution 152 and reward modifier 154, on a schedule, or in response to a trigger in order to keep user account information updated so that a user may be able to receive up-to-date information regarding their account. In an example, purchase tracking 122 may trigger a user account 172 update based upon receiving a notification of a tracked user loyalty purchase and purchase tracking may command rewards manager 112 and loyalty manager 110 to update the user account 172, such as by transmitting an equity reward status to user account 172 based on the tracked user loyalty purchase.

Equity allocation system 120 may manage purchasing, distributing, selling/liquidating, and forfeiting equity as well as updating current share prices. Equity allocation system 120 may include forfeit module 146, updater module 147, assign module 148, and sell module 178, and may be a module or database configured with rules and/or instructions for executing buy, sell, and/or forfeit orders of fractional or whole shares between loyalty platform 108 and clearing system 104 as well as, in some examples, between accounts 114 (including user accounts 172, 174, 176) and platform account 136. Equity allocation system 120 may additionally comprise a plurality of inventory accounts (shown in FIG. 2) for holding pre-purchased shares of stock from which fractional equity rewards may be distributed to user accounts 172, 174, and 176. Equity allocation system 120 may further include an average price account (shown in FIG. 2) for conducting street-side whole share purchases and sells.

Purchase tracking 122 may be a database or module configured to include instructions and rules configured to track virtual and real-world (e.g., in-store) purchases between users 102, 116, 118 and businesses 138, 140, 106. The purchase tracking system may further include payment medium storage database 124 in order to track purchases for user accounts 172, 174, 176 associated with user computing devices 102, 116, 118 who may execute transactions using payment media which have been registered (linked) and stored at payment medium storage 124. As an example, payment media stored within payment media storage 124 may include any applicable payment methods not limited to credit cards, debit cards, and online payment systems (for example, PAYPAL). In an example, payment medium storage 124 may include registration information relating to credit cards used for transactions between users and businesses. In another example, payment medium storage 124 may include registration information relating to only payments systems used for transaction between users and businesses. In another example, purchase tracking 122 may receive a notification or indication that a user has executed a transaction (for example, purchase or return).

The loyalty platform 108 may include platform account 136, which may comprise an administrator account 158 enabling platform administrators with the ability to make modifications to the loyalty platform 108, for example, adding or removing businesses to the loyalty selections available through loyalty manager 110, modifying rewards options available through rewards manager 112, modifying accounts 114, modifying equity allocation system 120, modifying dividend distribution 152, and varying the rewards provided to users at reward modifier 154.

The loyalty platform 108 may include platform account 136, which may comprise an administrator account 158 granting platform administrators with the ability to make modifications to the loyalty platform 108, for example, adding or removing businesses to the loyalty selections available through loyalty manager 110, modifying rewards options available through rewards manager 112, modifying accounts 114, modifying equity allocation system 120, modifying dividend distribution 152, and varying the rewards provided to users at reward modifier 154.

Loyalty platform 108 may also include dividend distribution 152 as a database or module comprising instructions or rules which may enable communication with clearing system 104 in order to distribute dividend payments whenever they are set to occur (such as quarterly). Clearing system 104 may, as an example, have information relating to when dividend payments are to be made and how much money or stock per share may paid-out. In one example, if a first business initiates a dividend payment process while a user holds a number of shares of stock in that business, but the user sells the number of shares of stock in the business before the dividend is received by the loyalty platform (such as may occur upon a user selecting to switch loyalty from the first business to a second business), once the dividend is received by the loyalty platform the loyalty platform may offer that dividend to the user as a cash reward (if the dividend comprises cash) or as an equity reward (if the dividend comprises an amount of shares of stock), the loyalty platform may further offer the user an option to redistribute the received dividend. Dividend payments handled by dividend distribution 152 may, in some examples, be sent to user funds 160 in user account 172. In another example, dividend payments handled by dividend distribution 152 may be sent directly to payments 150 via instructions included at user funds 160 to send payment to an account with payments 150 associated with user account 172.

Reward modifier 154 may be a module or database containing instructions configured to provide a reward modification to the normal reward, based upon random selection or based upon one or more actions taken by the user, such as a loyalty switch, accumulating more than a threshold amount of loyalty rewards, or further based one or more policies or promotional events of the rewarding business. As an example, the user may be entitled to a reward, or a normal reward, based upon the user's loyalty selection to a business, and, the normal reward may be modified based upon variable reward policies (discussed herein) to form a modified reward. As explained herein, when a user 102, 116, 118 executes a transaction, the purchase tracking 122 notifies reward modifier 154 of the transaction (which may have been made between a user and business wherein the user had made a loyalty selection to the business of the transaction) and further queries reward modifier 154 to see if the normal reward may receive a modified reward.

Turning now to FIG. 1B, example computing system 180 is shown. Computing system 180 may implement loyalty platform 108 alone, or in combination with other computing systems. In one example, computing system 180 may comprise a server. Computing system 180 includes display 175, input device 173, processor 182, network adapter 188, and non-transitory memory 184.

Display 175 may comprise a monitor, touch screen, projector, or any other device known in the art of computers for enabling a user to observe or sense information rendered by a digital device. Computing system 180 may have stored within non-transitory memory 184 instructions for rendering data, such as loyalty platform 108 data, within a graphical user interface which may be displayed by display 175.

Input device 173 enables a user to interface/interact with computing system 180, and may comprise one or more hardware devices, such as a mouse, keyboard, touch screen, motion tracking camera, or other devices configured to transform user motions, gestures, sounds, or other user actions into an electronic form which may enable a user to input data, or transmit, select, modify, or otherwise interact with data or data structures stored in or displayed by computing system 180.

Processor 182 may include one or more physical devices configured to execute instructions stored in non-transitory memory. For example, processor 182 may be configured to execute instructions that are part of one or more applications, services, programs, routines, libraries, objects, components, data structures, or other logical constructs included in loyalty platform 108.

Network adapter 188 may comprises one or more physical device associated with computing system 180, enabling transmission and reception of data between computing system 180 and one or more additional computing systems. Network adapter 188 may enable computing system 180 to access a local area network, and/or the Internet, and exchange data therewith, such as data which may enable tracking of user purchases and matching between transacting businesses and businesses registered with the loyalty platform (and therefor included in the rewarding-business index).

Non-transitory 184 memory includes one or more physical devices configured to hold data, including instructions executable by the processor to implement the methods and processes described herein. When such methods and processes are implemented, the state of non-transitory memory 184 may be transformed—e.g., to hold different data. The terms "module" and "program" may be used to describe an aspect of the computing system implemented to perform a particular function. The terms "module" and "program" may encompass individual or groups of executable files, data files, libraries, drivers, scripts, database records, etc. Non-transitory memory 184 includes the various files/routines/methods of loyalty platform 108 that when executed by processor 182 perform one or more of the steps herein described with reference to one or more of the disclosed methods. Computing system 180 may optionally include display(s), user input device(s), communication interface(s), and/or other components.

As shown in FIG. 1B, non-transitory memory 184 includes rewarding-business index 186. Rewarding-business index 186 may be stored within non-transitory memory 184 of computing system 180, and may comprise a database or module containing information regarding businesses registered with loyalty platform 108. In one example, rewarding-business index 186 may be used by computing system 180 in conjunction with purchase tracking 122 to quickly determine if a user purchase executed at a business is eligible for a fractional equity reward by matching a description of the transacting business, obtained by purchase tracking 122, with a description stored in rewarding-business index 186 associated with a business offering fractional equity rewards to loyalty users through loyalty platform 108.

In some examples, computing system 180 may be configured to implement a neural network or other machine learning algorithm, wherein the neural network comprises a classifier type neural network, configured to receive as input one or more details of a user transaction/purchase (also referred to as a transacting business description) and to use said input to produce as output a probability rank for one or more, or each, of the businesses stored within rewarding business index 186, wherein the probability rank indicates for a given business, the probability that the purchase occurred with said business. In other examples, computing system 180 may be configured to execute one or more machine learning algorithms capable of learning a non-linear mapping from a feature space comprising purchase details, to an output space comprising business classification scores/probabilities, wherein the learning algorithms may have access to rewarding business index 186, which includes an up to date listing of all businesses partnered with the loyalty platform.

To facilitate accurate matching between a transacting business and its associated reward program/policies implemented by loyalty platform 108, rewarding-business index 186 may include various features or pieces of data relating to the businesses listed therein. In one example, rewarding-business index 186 comprises a database with each entry therein corresponding to a unique business, wherein said entry may comprise a name/title, a link to the reward/loyalty policies established by the business, the status of the reward program associated with that business (such as "active", "cancelled", "pending deposit of funds", etc).

In one example, a business interested in offering equity rewards via loyalty platform 108 to customers to incentivize greater customer loyalty may register their business with loyalty platform 108. The registration process for businesses may include inputting information relating to the business into loyalty platform 108 and this information may be stored in non-transitory memory of computing systems implementing loyalty platform 108. In one example, business information may be stored in rewarding-business index 186 of one or more computing systems implementing the loyalty platform 108, such as computing system 180. As an example, the business information input into the rewarding-business index as part of the business registration process may include a description of the business, business payment information, business contact information, business locations/addresses, business hours of operation, markets in which the business operates (which may also be stored in markets 156), business reward policies/loyalty policies defining how a fractional equity reward is determined based on tracked user loyalty purchases (which may also be stored in one or more additional locations of loyalty platform 108, such as in loyalty policies 142, and reward policies 144), and other information which may enable the loyalty platform 108 to uniquely identify the business and operate a customer loyalty program customized for that individual business. In one example, a link to loyalty policies and/or reward policies associated with a business registered with the loyalty platform 108 may be included in an entry in rewarding-business index 186. In one example, rewarding business index 186 may contain an equation or algorithm (or a link pointing to a location in non-transitory memory wherein the equation or algorithm is stored) for determining an amount of fractional shares of stock to be allotted to a user based on a tracked user loyalty purchase conducted using a linked payment medium.

Further, rewarding-business index 186 may include product data regarding one or more products offered by one or more brands, wherein the product data may be used to match a tracked user loyalty purchase with a brand or business providing rewards through loyalty platform 108. In one example, product data may include product codes/identifiers for one or more products belonging to a brand. In a more specific example, rewarding-business index 186 may include a catalogue/database of products and product identifiers provided by one or more brands operating a loyalty program through loyalty platform 108, wherein the catalogue/database may include stockkeeping unit codes (SKUs) enabling unique identification for one or more products provided by one or more brands registered with loyalty platform 108. In one example, a user may conduct a purchase with a business, wherein the business sells products from a plurality of brands, and upon execution of the purchase, the business may transmit POS data regarding the transaction to the loyalty platform, wherein the POS data may include SKU level detail regarding each of the purchased products. The loyalty platform may match the one or more purchased products with one or more brands using rewarding-business index 186 by correlating the SKU codes included within the POS data to SKU codes included in rewarding-business index 186. In one example, the rewarding business index comprises a list of product identifiers for each brand/business included therein, and upon matching an SKU code included in POS data transmitted to the loyalty platform 108 from a business with an SKU code listed under a first brand in the rewarding-business index 186 the loyalty platform 108 may determine that the user is eligible to receive a reward from the first brand. The loyalty platform 108 may, in response to matching one or more brands using the POS data, reward the user based on the reward policies of the reward programs provided by the one or more brands, and further based on the price of the one or more products purchased from the one or more brands. In another example, upon execution of a transaction between a user and a business, the business may determine which brands correspond to the one or more purchased products, and may transmit the indicated brands to the loyalty platform 108. In this way, the loyalty platform may reward a user with rewards from a plurality of brands/businesses based on a single purchase, by resolving a purchase using data of each purchased product. In some examples, based on a user purchase with a business, wherein the purchase comprises a purchase for a product from a brand, wherein both the business and the brand provide rewards through the loyalty platform, and wherein the user has an active loyalty selection to both the business and the brand, the user may receive rewards from both the business and the brand through the loyalty platform.

A business or brand listed in rewarding-business index 186 may be removed, deleted, or overwritten, upon suspension or cancellation of the equity rewards program established for that business. In another example, upon cancellation or suspension of a customer loyalty program offered by a business, a flag may be set in the entry corresponding to that business in the rewarding-business index, thereby indicating that no equity rewards may be earned based on tracked user loyalty purchases at this business at this time, thus retaining business information within the rewarding-business index and bypassing the need to re-enter information relating to said business into the rewarding-business index in the event that the customer loyalty program associated with the business is resumed at a later time.

Rewarding-business index 186 may be stored in a location of non-transitory memory 184 of computing system 180 and information stored therein may be accessed by computing system 180 upon execution by processor 182 of one or more methods stored in loyalty platform 108, some examples of which are described herein. In one example, rewarding-business index 186 may be accessed by purchase tracking 122 of loyalty platform 108 to attempt to match/correlate a description of a business with which a user recently made a purchase (herein also referred to as a transacting business description) with a description stored in rewarding-business index 186. The transacting business description, comprising data pertaining to the transacting business, may be obtained by loyalty platform 108 via a linked payment medium used to conduct the purchase, or alternatively, through a point of sale device of the transacting business which is configured to transmit purchase details to the loyalty platform, or from a third party purchase data aggregator. If the transacting business description matches a description of a business stored in rewarding-business index 186, the user may be entitled to a fractional equity reward for the tracked user loyalty purchase and one or more additional actions may be taken, such as look-up of the reward policies linked with the rewarding business. The link may be stored in rewarding business-index 186 in a location associated with the rewarding business description, the link may point to a location of non-transitory memory 184 associated with reward policies 144. Thus, rewarding-business index 186 enables computing system 180 to automatically determine if a tracked user purchase is eligible to receive a reward or may be eligible to receive a reward (such as upon a user accepting a loyalty-switch offer) without requiring the user to submit proof-of-purchase information, or perform other potentially annoying tasks employed by conventional rewards programs.

In this way, rewarding-business index 186 may enable loyalty platform 108 to rapidly and automatically determine if a tracked user purchase is in fact a tracked user loyalty purchase and is therefore eligible to receive a fractional equity reward. This may reduce the time between when a user executes a user loyalty purchase and when a fractional equity reward based on that purchase is distributed to the user compared to conventional approaches which require a user to manually input a code or other proof-of-purchase/proof-of-reward. Additional features of the disclosure which may further enable increased speed of fractional equity reward distribution, as well as further enable increased liquidity in the fractional equity rewards once distributed, are discussed below with reference to FIG. 2 and the equity allocation system 120 therein.

Figure 2:
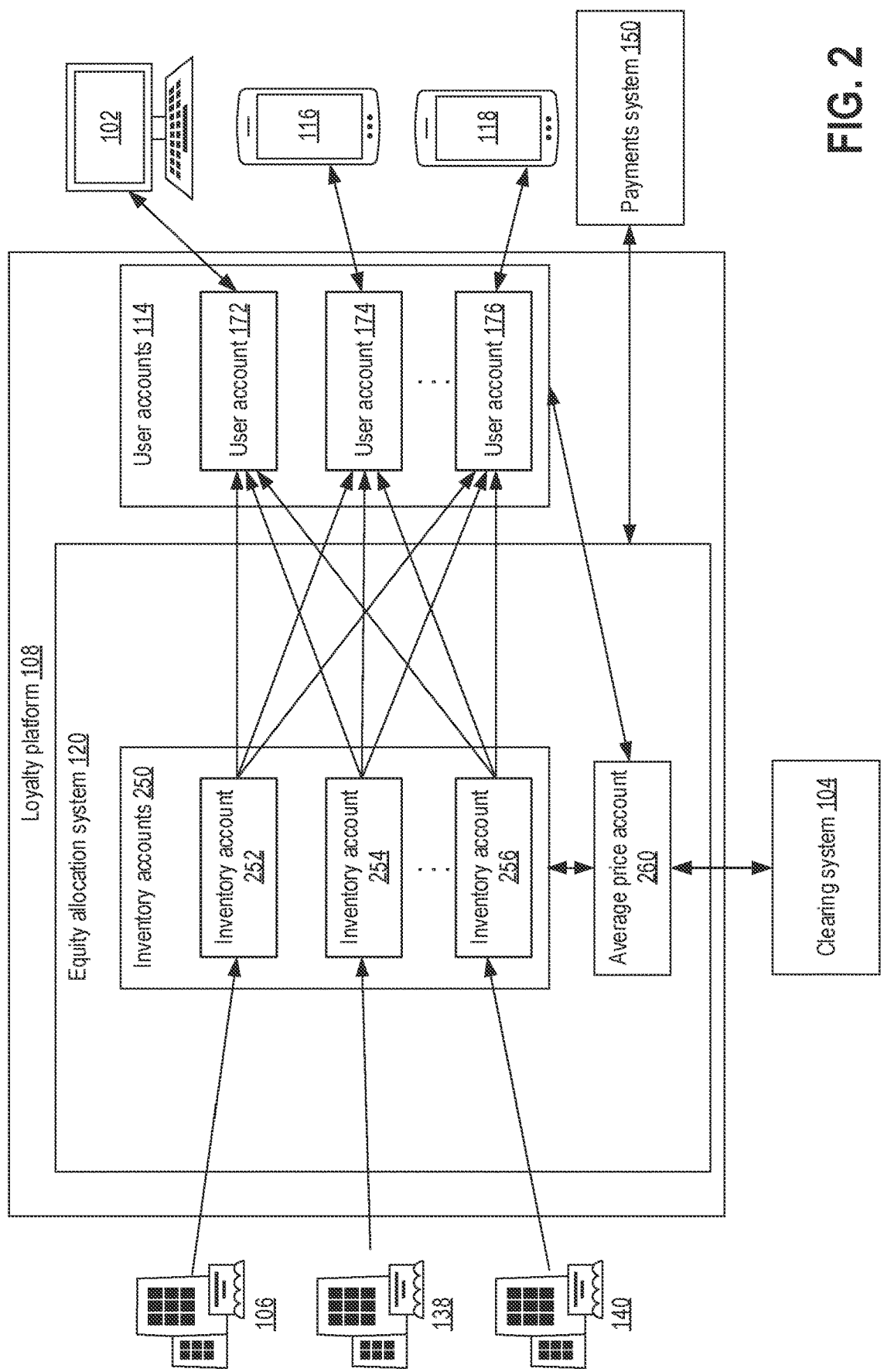
FIG. 2 shows an example equity allocation system of the loyalty platform.

FIG. 2 shows equity allocation system 120, which represents one exemplary embodiment of a system for acquiring, aggregating, distributing, liquidating, and otherwise managing fractional equity rewards on a loyalty platform, such as loyalty platform 108. Elements of FIG. 2 which were previously illustrated and described above shall retain their numbering in FIG. 2. Although the accounts within equity allocation system 120, as discussed herein, are included within loyalty platform 108, it will be appreciated that such accounts may be held or maintained by a third party without departing from the scope of the current disclosure. In one example, the accounts discussed with reference to FIG. 2 may be maintained by a brokerage firm or clearing house/clearing system on behalf of a loyalty platform. In another example, the loyalty platform may operate and/or maintain the accounts discussed with reference to FIG. 2. In the case that the accounts within equity allocation system 120 are operated by a third party brokerage firm, equity allocation system 120 may electronically communicate with one or more of the accounts via a network to enable one or more of the steps or actions described herein with reference to said accounts.

The accounts discussed with reference to FIG. 2 may comprise instructions stored in non-transitory memory of a computing system, such as a computing system 180 implementing loyalty platform 108, wherein the instructions enable the accounts to hold, trade, buy, and sell securities. In one example the securities may comprise shares of stock in a business. In another example the securities may comprise other kinds of securities, such as one or more of government bonds, municipal bonds, mutual funds, futures options, and stock options. In another example, the accounts discussed with reference to FIG. 2 may be configured to buy, sell, trade, hold, or otherwise interact with, crypto assets, such as cryptocurrency, tokens, smart contracts, etc. In one example, the accounts discussed with reference to FIG. 2, such as average price account 260 may be configured to hold, trade, buy and sell shares of stock in publicly traded businesses. The accounts discussed with reference to FIG. 2 may also be configured to send and receive funds (fiat currency, such as USD) to one or more other accounts, such as, but not limited to, other accounts discussed with reference to FIG. 2. In one example, inventory account 252 may send an amount of USD to the average price account 260 in exchange for an amount of a security, such as a share, or fractional share, of stock. Equity allocation system 120 is shown accompanied by various interacting systems, such as user computing systems 102, 116, and 118, businesses 106, 138, and 140, clearing system 104, and payments system 150. Equity allocation system 120 may alone, on in conjunction with other systems herein described, perform one or more steps of methods 300, 400, and 500 herein disclosed. Equity allocation system 120 comprises, inventory accounts 250, and average price account 260.

Inventory accounts 250 may comprise a plurality of inventory accounts, and each may be funded by a unique business/merchant to enable said inventory account to reward loyalty customers of the merchant with fractional equity rewards on behalf of the merchant. In one example, each inventory account may provide fractional equity rewards to a plurality of users, wherein the fractional equity rewards comprise shares of stock in the business/merchant funding the inventory account, such that inventory account A, funded by business B may provide fractional equity rewards to users of a loyalty platform comprising fractional shares of stock in business B.

As depicted in FIG. 2, inventory accounts 250 comprise inventory account 252, inventory account 254, and inventory account 256, which are associated with business 106, business 138, and business 140, respectively. Although FIG. 2 depicts three inventory accounts, the current disclosure will be understood to provide for any number of inventory accounts, each associated uniquely with a business, to facilitate the distribution of fractional equity rewards on behalf of the business. In one example, as part of a Merchant Agreement between the loyalty platform and a business seeking to provide fractional equity rewards to loyalty customers via the loyalty platform, a business may agree to fund an associated inventory account to enable a pre-purchased supply of shares within an associated the inventory account to remain above a lower supply threshold. In another example, the business may agree to fund an associated inventory account based on the discretion of the loyalty platform. It will be appreciated that the lower supply threshold, as well as the upper supply threshold of each of the plurality of inventory accounts within inventory accounts 250 may be determined individually, and may therefore each comprise unique upper supply thresholds and lower supply thresholds or may comprise the same upper supply thresholds and lower supply thresholds, or may comprise any combination of upper supply thresholds and lower supply thresholds of any positive, non-zero value. In one example, when a pre-purchased supply of shares within an inventory account exceeds an upper supply threshold, a number of whole shares from the pre-purchased supply of shares may be automatically sold/liquidated, such as by placing a sell order via average price account 260, to maintain the pre-purchased supply of shares below the upper supply threshold. The number of whole shares sold, based upon the pre-purchased supply of shares exceeding the upper supply threshold, may vary based on the amount by which the pre-purchased supply of shares exceeds the upper supply threshold, and likewise, the number of whole shares purchased based on the pre-purchased supply decreasing below a lower supply threshold may vary based on the extent to which the pre-purchased supply is below the lower supply threshold. In one example, a minimum number of whole shares may be purchased, or sold, to return a pre-purchased supply of shares to between the upper supply threshold and lower supply threshold. In another greater than the minimum number of whole shares may be purchased, or sold, to return a pre-purchased supply of shares to between the upper supply threshold and lower supply threshold. Funds obtained from liquidating/selling a number of whole shares from the pre-purchased supply of shares may return to the inventory account for later use (such as for use in purchasing additional shares to replenish the pre-purchased supply of shares). In a contrasting example, when a pre-purchased supply of shares within an inventory account is lower than a lower supply threshold, a number of whole shares of stock may be automatically purchased, such as by placing a buy order via average price account 260, to replenish the pre-purchased supply of shares and maintain the pre-purchased supply of shares above the lower supply threshold.

In one example, the upper and lower supply thresholds for an inventory account providing fractional equity rewards to users on behalf of a business may increase as a running average rate of fractional equity reward distribution for that business increases. For example, if the total amount of fractional equity rewards earned per day by loyalty customers of business A doubles, the lower supply threshold and upper supply threshold of an inventory account associated with business A may also double. In another example, if a predicted event is determined to increase a rate of fractional equity reward accrual by loyalty customers of a business, the upper and lower supply thresholds for an inventory account providing fractional equity rewards to loyalty customers on behalf of that business may also increase. Some examples of predicted events may include a sale, the end of a fiscal year (or other date relative to the fiscal year), a deadline associated with taxes, a promotional offer, a holiday (such as black Friday, Christmas, etc.), or other foreseeable future events which may influence the amount of fractional equity rewards earned by users. In another example, based on a variance of fractional equity reward accrual for loyalty customers of a business increasing, (for example, a standard deviation for a running average rate of fractional equity reward accrual increasing), a lower supply threshold may be decreased and an upper supply threshold may be increased, for an inventory account distributing fractional equity rewards to loyalty customers of the business. In a contrasting example, based on a variance of fractional equity reward accrual for loyalty customers of a business decreasing, (for example, a standard deviation for a running average rate of fractional equity reward accrual decreasing), a lower supply threshold may be increased and an upper supply threshold may be decreased, for an inventory account distributing fractional equity rewards to loyalty customers of the business. As another example, the upper and lower supply thresholds of an inventory account associated with a business may be determined based on a total monetary value of all fractional equity rewards distributed to users on behalf of the business over the previous 10 days.

By dynamically adjusting a pre-purchased supply of shares within an inventory account based on an upper and lower supply threshold, as discussed above, a probability of interruption/delay in the distribution of fractional equity rewards to users, such as may occur if the pre-purchased supply drops below the lower supply threshold, is reduced. Further, by determining the upper and lower supply thresholds for each of the plurality of inventory accounts individually, and based on a running average rate of fractional equity reward distribution for each business associated therewith, a balance may be struck between reducing the amount of equity held within an inventory account and reducing the probability that a fractional equity reward earned by a user may be delayed.

Inventory accounts 250 may comprise brokerage accounts and thus may be configured to hold both fiat currency and equity. Each of the inventory accounts within inventory accounts 250 may be configured to communicate with other modules, systems, or components of loyalty platform 108. For example, inventory accounts 250 may have access to each of the user accounts stored within user accounts 114, which may enable inventory accounts 250 to calculate aggregate pending fractional equity rewards owed to these user accounts by one or more of the plurality of inventory accounts within inventory accounts 250. In another example, the calculation of pending fractional equity rewards associated with each of the plurality of inventory accounts may be determined on a per account basis; that is, each of the inventory accounts with inventory accounts 250 may perform an independent calculation of the amount of pending fractional equity rewards it may be responsible for satisfying. In one example, based upon a determination by an inventory account, such as inventory account 254, that an amount of aggregate pending fractional equity rewards owed by inventory account 254 to one or more of a plurality of user accounts is greater than a threshold amount, a request may be sent by inventory account 254 to business 138 requesting a transfer of an amount of funds to conduct a whole share purchase with, to increase the pre-purchased supply of shares held within inventory account 254.

Each of the inventory accounts within inventory accounts 250 may be configured to send and receive funds and shares of stock. For example, each account inventory accounts 250 may be configured to receive funds from payment system 150, transfer funds to the average price account 260, receive shares of stock from the average price account 260, and distribute the shares of stock from a pre-purchased supply of shares amongst a plurality of user accounts. As a specific example, $500 may be transferred from a bank account of a business, via payment system 150, to inventory account 256, which may then be transferred to the average price account 260 in exchange for $500 worth of equity (purchased by the average price account 260 from an exchange, such as the NYSE). Once the $500 worth of equity is received by inventory account 256, it may be added to a pre-purchases supply of shares stored therein, and used to provide fractional equity rewards to a plurality of user accounts stored within user accounts 114, to satisfy pending fractional equity rewards. The $500 worth of equity may comprise an amount of fractional shares of stock or may be a number of whole shares of stock. In the case that the $500 worth of equity comprises a fractional amount of shares of stock, the average price account 260 may round-up the fractional amount of shares of stock to the nearest whole share to enable the buy-order to be executed by a conventional exchange. For example, if the $500 equates to 9.6 shares of stock, the average price account may round-up the 9.6 shares to 10.0 shares.

Average price account 260 may be configured to conduct whole share buys and sells via clearing system 104. In one example, clearing system 104 may comprise a computing system with instructions for executing buy and sell orders for securities on an open market, such as the NYSE. Average price account 260 may be configured to send and receive both funds and securities to/from one or more of the other accounts discussed with reference to FIG. 2. Average price account 260 may comprise instructions stored in non-transitory memory of a computing system to perform one or more of the functions/steps/methods discussed herein. In one example, average price account 260 may comprise instructions to allocate purchased whole shares of stock within a duration of time from the time of purchase, thereby reducing the balance for a given equity to zero by a pre-determined duration from the time of purchase. In one example the duration of time may be 24 hours. In another example, the duration of time may be 6 hours. In another example, the average price account may comprise instructions to allocate the entirety of acquired/purchased whole shares of stock by a pre-determined time. For example, average price account 260 may be configured with instructions to allocate the entirety of its securities to other accounts of the loyalty platform and/or equity allocation system 120 by market close each day, such that securities are not held by average price account 260 overnight.

Figure 3:
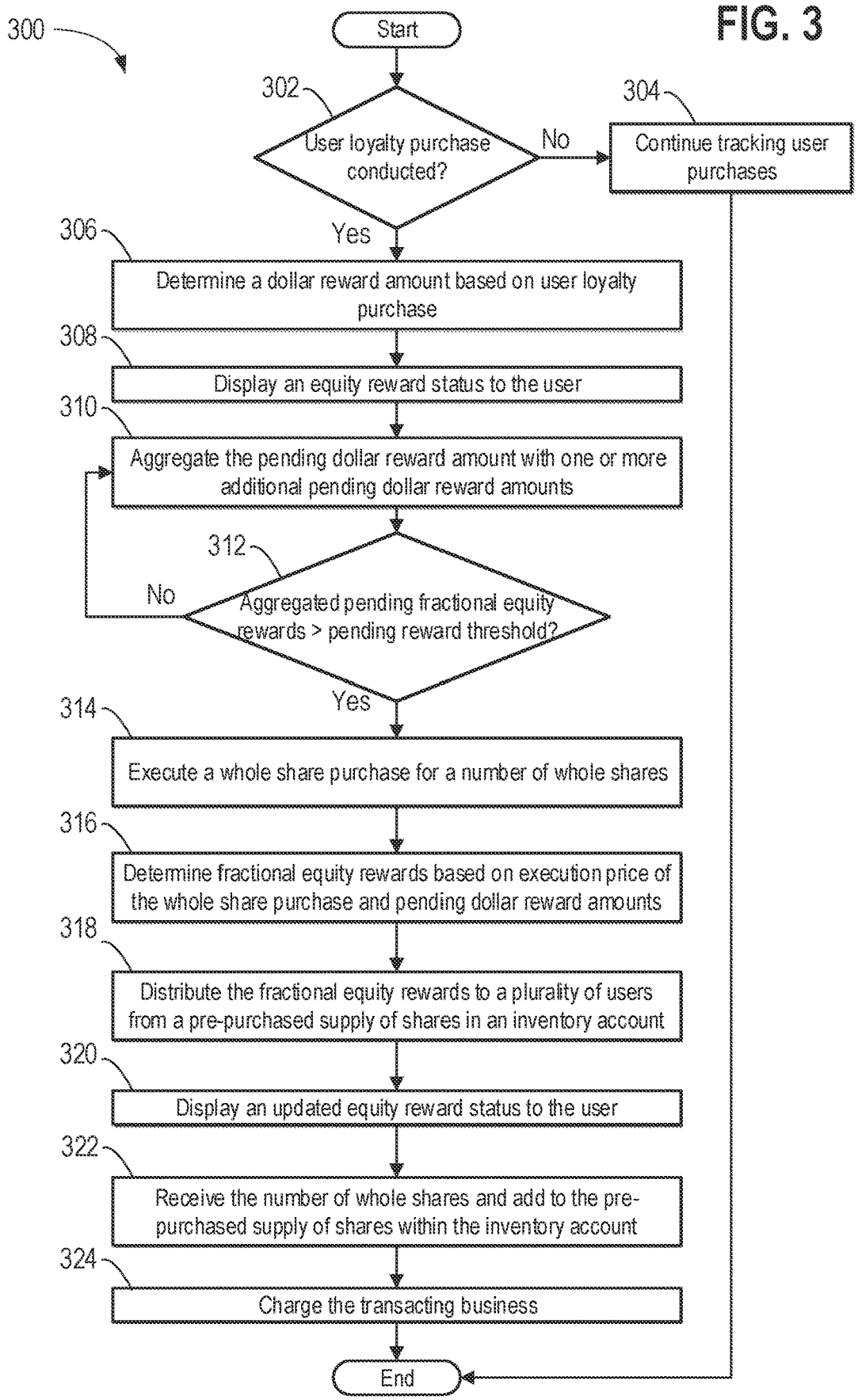
FIG. 3 shows a high level flowchart of a method for acquiring and distributing fractional shares of stock to users of the loyalty platform.

Turning to FIG. 3, an example method 300 for distributing fractional equity rewards is shown. Method 300 may enable faster distribution of fractional equity rewards to users compared to conventional methods. For example, by maintaining a pre-purchased supply of shares in an inventory account of the loyalty platform for providing fractional equity rewards to users of a loyalty platform, and by dynamically adjusting the pre-purchased supply of shares based on an upper supply threshold and a lower supply threshold, a probability of reward distribution delay may be reduced, and efficiency of automatic fractional equity reward distribution may be enabled. In another example, by aggregating pending dollar reward amounts of a plurality of users, and executing a whole share purchase based on the aggregated pending dollar reward amounts surpassing/exceeding a pending reward threshold, a pre-purchased supply of shares may be more efficiently maintained, and a reduction in the number of whole share purchases made on the open market may be enabled. Additionally, by indicating to users the progress/current stage of their pending fractional equity rewards, such as by indicating to a user when a purchase entitles that user to a reward, indicating that the process of reward distribution has been initiated, and indicating when the reward has actually been distributed/credited to their account, user impatience may be reduced. In one example, method 300 may be stored in non-transitory memory of a computing system implementing a loyalty platform, such as computing system 180, and one or more, or all, of the steps of method 300 may be automatically executed by the loyalty platform, or by one or more subcomponents, modules, databases, or subsystems of the loyalty platform.

Method 300 begins at 302, wherein a loyalty platform, such as loyalty platform 108, may determine if a user loyalty purchase has been conducted. A user loyalty purchase may comprise a transaction in which a user, with an account on a loyalty platform and a loyalty selection to a first business, exchanges currency with the first business in exchange for goods or services, wherein the first business is registered with the loyalty platform and provides fractional equity rewards to loyalty customers therethrough (loyalty customers, as used herein with reference to a business, may refer to users of a loyalty platform, such as loyalty platform 108, which have a loyalty selection to the business). The first business may be included in a database of the loyalty platform, such as rewarding-business index 186, and this database may be used to correlate information obtained regarding a user purchase with a business registered with the loyalty platform and actively offering equity rewards therethrough.

In one example, the loyalty platform may obtain details of a user purchase through a third party data aggregator, from the merchant acquirer, from a bank, a payment card network, or alternatively the loyalty platform itself may aggregate details of a user loyalty purchase via payment media account information provided to the loyalty platform by the user. The loyalty platform may then correlate purchase details with a database of registered businesses to ascertain if the user purchase was conducted with a business offering fractional equity rewards through the loyalty platform. In one example, the process of correlation may comprise inputting purchase details acquired for a given purchase into a neural network trained to match a set of purchase details with a unique business within a database of the loyalty platform (such as rewarding-business index 186). In another example, the neural network may output a confidence score based on the correlation, such that for a given purchase, a confidence score associated with the most likely business may be output. A confidence score threshold for business matching may be employed, such that a confidence score greater than a confidence score threshold may trigger the automatic reward distribution process, while a confidence score below the confidence score threshold may not trigger the automatic reward distribution process. In another example, a confidence score below a confidence score threshold may trigger an enhanced review process for a given purchase, wherein the details of the tracked purchase may be subjected to one or more enhanced review procedures, such as by displaying purchase details to an operator for evaluation. The enhanced review process may include determining if a user loyalty purchase occurred based on the purchase details.

The loyalty platform may further ascertain which customer account is associated with the tracked user purchase and may subsequently determine if said user account has a current loyalty selection to the business with which the user conducted their purchase. If the business is registered with the loyalty platform and the user account associated with the purchase includes a loyalty selection to the business, the tracked user purchase may be determined to be a tracked user loyalty purchase, and may therefore be eligible to receive a fractional equity reward. However, if at 302 it is determined that no user loyalty purchase has been conducted, method 300 may proceed to 304, which includes the loyalty platform continuing to track/monitor user purchases. Method 300 may then end. However, if at 302 it was determined that a user loyalty purchase has occurred, method 300 may proceed to 306.

At 306, method 300 includes determining a dollar reward amount based on the user loyalty purchase. The determination of a dollar reward amount may be based on a monetary value of the user loyalty purchase, reward policies of the business with which the purchase was conducted, and may further be based on a transaction history or loyalty history of the user who conducted the loyalty purchase. As an example, based on a user loyalty purchase with a monetary value of $150 and further based on the reward policies of the business with which said purchase was conducted comprising a reward rate of 2%, a dollar reward amount of $3 worth of a fractional share of stock Y (the USD equivalent of a reward to be distributed in the form of equity may be herein be referred to as a dollar reward amount). The dollar reward amount and corresponding fractional equity reward may be rounded up or down to the prescribed number of decimal places. For example, a $3.24 purchase at a 2% reward yields $0.0648. That may be rounded up to $0.07 or rounded down $0.06, at the discretion of the loyalty platform. Alternatively, at 306, the business with which the user loyalty purchase was conducted may transmit a dollar amount to the loyalty platform to reward a user. The business may further transmit an indication of one or businesses/brands for which the dollar amount is to be used to purchase equity in.

At 308, method 300 includes displaying an equity reward status to the user. In one example, the equity reward status may be rendered on a display of a computing device associated with the user account to receive the pending fractional equity reward. In one example, the equity reward status may comprise one or more of a push notifications, email, or other electronic communications. In another example, the equity reward status may indicate the pending dollar reward amount, or the pending amount of fractional shares of stock to be distributed to a user, the title of the purchase for which the reward was earned, and an estimated reward fulfillment time of the reward. The dollar reward amount may be determined as indicated above, with reference to step 306, while the estimated reward fulfillment time may be based on one or more parameters associated with the fractional equity reward distribution process. As an example, the estimated reward fulfillment time may be based on one or more of the current amount of pending fractional equity rewards, a rolling average reward fulfilment time for previously distributed rewards, a current rate of pending fractional equity reward aggregation, and an amount of funds held within the merchant deposit account associated with the current pending fractional equity reward. For example, an estimated reward fulfillment time may be fine-tuned by adjusting a rolling average reward fulfillment time with a current rate of aggregation for pending fractional equity rewards in the same stock as the current reward. In the case that the rate of aggregation is above a baseline level, such as when a current rate of aggregation is above a running average rate of aggregation, the estimated reward fulfillment time may be calculated by multiplying the running average rate of reward fulfillment time by a factor (such as a non-zero factor less than 1 in the case of rate of reward fulfillment faster than a running average rate, or a factor greater than 1 in the case of a reward fulfillment time slower than a running average). It will be appreciated that although method 300 includes displaying a first equity reward status and an updated equity reward status, any positive integer number of equity reward statuses may be displayed to a user computing device to enable updates regarding the pending fractional equity reward based on any number of steps or events occurring during the fractional equity reward distribution process. Upon displaying the equity reward status method 300 may then proceed to 310.

At 310, method 300 includes aggregating a plurality of pending dollar reward amounts for a plurality of users. In one example, the pending dollar reward amounts may be aggregated by an inventory account associated with a business, for which the dollar reward amounts are to be distributed. Aggregation may comprise a numerical addition of a new pending dollar reward amounts to a previously aggregated pending dollar reward amount. The aggregated pending dollar reward amounts may be stored in non-transitory memory of a computing system associated with the loyalty platform and may be accessed by one or more of the accounts within an equity allocation system of the loyalty platform, such as equity allocation system 120. Method 300 may then proceed to 312.

At 312, method 300 includes evaluating if aggregated pending fractional equity rewards, equivalent to the dollar reward amounts, exceed a pending reward threshold. An equivalent aggregated pending fractional equity reward may be calculated based on an aggregated pending dollar reward amount by dividing the aggregated pending dollar reward amount by the current market price of the stock to be rewarded/purchased. The pending reward threshold may be chosen to limit or reduce the number of whole share purchases conducted by the loyalty platform, and further, to more tightly and efficiently control a pre-purchased supply of shares within an inventory account, by ensuring the number of whole shares purchased is within a threshold amount of the aggregated pending fractional equity reward corresponding to the aggregated pending dollar reward amount. Each cycle of pending reward aggregation, reward purchase, and reward distribution may be herein referred to as a reward distribution cycle. For example, the pending reward threshold may be chosen such that the amount of aggregated pending fractional equity rewards equivalent to the aggregated pending dollar reward amount is within a threshold of a nearest whole number of shares. In a specific example, a pending reward threshold of 0.8 shares of stock X may be chosen in order to reduce the fractional remainder of shares left over after 1.0 shares of stock X is purchased, and a 0.80 shares of stock X is taken from the purchased 1.0 shares to satisfy pending fractional equity rewards, thereby limiting the amount of fractional remainders of shares to 0.20 shares of stock X or less. If the loyalty platform determines that the aggregated pending fractional equity rewards equivalent to the aggregated pending dollar reward amount does not exceed a pending reward threshold, method 300 may return to 310 and continue aggregating pending fractional equity rewards until the amount of aggregated rewards exceeds the pending reward threshold. The pending reward threshold enables more efficient control over the pre-purchased supply of shares within inventory accounts of the loyalty platform and may thereby reduce inefficiencies associated with accruing fractional remainders of shares left over from reward distribution. However, if at 312 the loyalty platform determines that the aggregated pending fractional equity rewards equivalent to the aggregated pending reward amounts exceed the pending reward threshold, method 300 may proceed to 314.

At 314, method 300 includes executing a whole share purchase based on the amount of aggregated pending fractional equity rewards. For example, based on the amount of aggregated pending fractional equity rewards surpassing a pending reward threshold, an indication may be sent to the average price account to execute a whole share purchase based on the aggregated pending fractional equity rewards. If the amount of aggregated pending fractional equity rewards does not equal a whole number of shares, the aggregated pending fractional equity rewards may be rounded-up to the nearest whole number of shares and the average price account may place a buy order for this rounded-up number of whole shares. For example, if the amount of aggregated pending fractional equity rewards is 0.4 shares of stock Y, this amount may be rounded-up to 1.00 shares of stock Y, which is the nearest whole number of shares greater than the pending fractional equity reward, and a buy order, or a whole share purchase, for this amount may be placed on a clearing system by the average price account. Once the whole share purchase order/buy order has been filled, the average price account may be debited a monetary value corresponding to the purchased whole shares of stock and the average price account may be credited with the purchased amount of whole shares of stock. Method 300 may then proceed to 316.

At 316, method 300 may include calculating a plurality of pending fractional equity rewards based the execution price for whole share purchase, and further based on the plurality of pending dollar reward amounts. In one example, fractional equity reward to distribute to a user may be determined by dividing a pending dollar reward amount for the user by the execution price for the number of whole shares acquired in the whole share purchase of step 314. As a specific example, based on a pending dollar reward amount of $4.5 to user A, and an execution price of $10.0/share of stock X, a fractional equity reward of 4.5 shares of stock X may be determined for user A. Method 300 may then proceed to 318.

At 318, method 300 includes distributing fractional equity rewards from an inventory account to a plurality of users, based on pending fractional equity rewards owed to the plurality of users. For example, a portion of pre-purchased supply of shares within the inventory account may be distributed amongst the plurality of users in amounts equal to the pending fractional equity reward amounts owed to each user, such as were determined in step 316. For example, 0.8 shares of stock from a pre-purchased supply of stock in a inventory account corresponding to business Z may be distributed to a user account of user A and a user account of user B, to satisfy pending fractional equity rewards of 0.2 shares of stock in business Z and 0.60 shares of stock in business Z, owed to user A and user B respectively, wherein 0.20 shares of the 0.80 shares are transferred to the account of user A and 0.60 shares of the 0.80 shares are transferred to the account of user B. An order of distribution of the portion of equity in the merchant facilitation account may be determined by the loyalty platform. In one example, the order of fractional equity reward distribution may be based on a timing of when the user loyalty purchases associated with each fractional equity reward occurred, such that users with rewards pending for longer durations may have an associated fractional equity reward distributed to an associated user account before a user with a reward pending for a shorter duration. Method 300 may then proceed to 320.

At 320, method 300 may include displaying an updated equity reward status to one or more of the plurality of users to whom a fractional equity reward was distributed in step 318. In one example, updated equity reward status may comprise one or more of a push notification, email, SMS message, or other electronic communications. In one example, the updated equity reward status may include a visual representation of the amount of fractional equity reward distributed to a user account on the loyalty platform, along with updated totals of equity held by the user account in a reward portfolio. The equity reward status may be rendered within a graphical user interface implemented by a display of a user computing device used to connect with the loyalty platform over a network, such as the Internet. Upon distribution of an amount of fractional shares of stock from a pre-purchased supply of shares within an inventory account to a plurality of user accounts, each of the users associated with the plurality of user accounts may receive an updated equity reward status. An order of sending the updated equity reward statuses may be staggered to reduce consumption of bandwidth by the loyalty platform at any given instant to below a threshold level of bandwidth. Alternatively, each updated equity reward status may be sent out without staggering, and as such a plurality, or all, of the updated equity reward statuses may be sent out simultaneously. Each of the updated equity reward statuses may contain unique information, specifically pertaining to the associated user and user account. Method 300 may then proceed to 322.

At 322, method 300 includes receiving the number of whole shares purchased at step 314, and adding the number of whole shares to the pre-purchased supply of shares within the inventory account. The loyalty platform may at this time determine if a whole share sell order, or a whole share purchase order, is to be placed with the average price account, to adjust in substantially real time the pre-purchased supply of shares based on the upper supply threshold and the lower supply threshold, as discussed in more detail below with reference to FIG. 4. Method 300 may then proceed to 324.

At 324, method 300 may include charging the business (on whose behalf fractional equity rewards were distributed to the plurality of users) based on the number of whole shares purchased at step 314, and further based on administrative or service fees associated with the reward distribution. In one example, the loyalty platform may charge a participating business after completion of a reward distribution cycle. A bank account, or other payment account of the business, may transfer funds to the loyalty platform via a payment system, such as payment system 150. Method 300 may then end.

In this way, method 300 may enable fractional shares of stock to be distributed to a plurality of users more rapidly than conventional methods, while reducing the amount of equity needed to be maintained within an inventory account and reducing user frustration associated with lack of feedback regarding equity reward statuses.

Turning now to FIG. 4, an example method 400 for managing an inventory account is shown. Specifically, FIG. 4 gives one example of a method for dynamically adjusting in substantially real time a pre-purchased supply of shares within an inventory account which may be used to provide fractional equity rewards to users. One or more of the steps of method 400 may be automatically executed by a loyalty platform, such as loyalty platform 108, configured with an equity allocation system, such as equity allocation system 120. As discussed previously with reference to FIG. 2, an inventory account within inventory accounts 250, may be included within a loyalty platform, and may perform functions related to managing a pre-purchased supply of shares for providing fractional equity rewards to users. Method 400 gives one example of a method by which an inventory account of a loyalty platform may determine when and how to conduct whole share purchases or whole share sells to control the amount of equity stored therein (comprising the pre-purchased supply of shares) based on an upper supply threshold and a lower supply threshold. Although the example of method 400 is given with reference to a single inventory account, it will be appreciated that the similar, or the same, method of inventory account management may be employed on a plurality of inventory accounts. In one example, there may be a plurality of inventory accounts, each managing separate pre-purchased supplies of shares, wherein each pre-purchased supply of shares comprises shares of a single type of stock. Therefore, there may be a one-to-one correspondence between a plurality of stocks used to reward users on a loyalty platform, and the plurality of inventory accounts. In another example, a single inventory account may be used, which is configured to hold a plurality of stocks, and may execute management methods, such as method 400, on each of the plurality of stocks separately.

Method 400 begins at 402, which may include the loyalty platform evaluating if a pre-purchased supply of shares is greater than an upper supply threshold. If at 402 it is determined that the pre-purchased supply of shares is greater than the upper supply threshold, method 400 may proceed to 404. The upper supply threshold for a given inventory account associated with a business, may be based on historical data associated with distribution of rewards for the business, as well as on extrapolations of this, or other data. For example, the upper supply threshold may be based on a running average rate of reward accrual. For example, based on a rate of reward accrual for stock X, of 10 shares/day, an upper supply threshold may be determined. As an example, a pre-purchased supply of shares of stock may be controlled to be greater than 2 days worth of rewards (20 shares of stock according to the above example) based on the current rate of reward accrual and less than 5 days worth of rewards (50 shares of stock according to the above example) based on the current rate of reward accrual. The upper supply threshold may be adjusted as the running average rate of reward accrual changes. Further, the upper supply threshold may be adjusted based on predicted events which may impact a rate of reward accrual, such as a holiday, a sale, or other promotional offer or foreseeable event which may influence a rate of purchases made with a business, and therefore which may influence a rate of reward accrual and distribution.

At step 404, method 400 includes liquidating/selling a number of whole shares by placing a sell order for a number of whole shares within the inventory, via an average price account (alternatively the sell order may be placed directly on the open market from the inventory account). The number of whole shares to be sold may be determined based on the extent to which the pre-purchased supply of shares exceeds the upper supply threshold, and may include placing a sell order for the minimum number of whole shares to bring the pre-purchased supply of shares below the upper supply threshold. As another example, the number of whole shares to be sold via the sell order may comprise the maximum number of whole shares which may reduce the pre-purchased supply of shares below the upper supply threshold, while not reducing the pre-purchased supply of shares below the lower supply threshold. As a specific example, based on an upper supply threshold of 10 shares of stock X, a lower supply threshold of 5 shares of stock X, and based on a pre-purchased supply of shares of 11.5 shares of stock X, the maximum number of whole shares to be sold may be 6.0 shares of stock X (resulting in the after sale pre-purchased supply of shares equaling 5.5 shares of stock X) while the minimum number of whole shares of stock X which may be sold may be 2.0 shares of stock X (resulting in the after sale pre-purchased supply of shares equaling 9.5 shares of stock X). It will be understood that the number of whole shares of stock sold based on a pre-purchased supply of shares within an inventory account may comprise any number of whole shares which would result in an after sale pre-purchased supply of shares between the upper supply threshold and the lower supply threshold. Upon completion of the whole share sale at 404, and allocation of the funds obtained thereby in the associated inventory account for later use in purchasing whole shares, method 400 may then end. However, if 402 it is determined that pre-purchased supply of shares is below the upper supply threshold, method 400 may proceed to 406.

At 406, method 400 includes evaluating if the pre-purchased supply of shares is less than a lower supply threshold. If at 406 it is determined that the pre-purchased supply of shares is greater than the lower supply threshold, method 400 may proceed to 410, which includes continuing to provide fractional equity rewards to users from the pre-purchased supply of shares within the inventory account without conducting dynamic adjustment of the pre-purchased supply of shares. Method 400 may then end. However, if at 406 it is determined that the pre-purchased supply of shares is less than the lower supply threshold, method 400 may proceed to 408. The lower supply threshold for a given inventory account associated with a business, may be based on historical data associated with distribution of rewards for the business, as well as on extrapolations of this, or other data. For example, the lower supply threshold may be based on a running average rate of reward accrual. For example, based on a rate of reward accrual for stock X, of 10 shares/day, a lower supply threshold may be determined. As an example, a pre-purchased supply of shares of stock may be controlled to be greater than 1 day worth of rewards (10 shares of stock according to the above example) based on the current rate of reward accrual and less than 3.5 days worth of rewards (35 shares of stock according to the above example) based on the current rate of reward accrual. The lower supply threshold may be adjusted as the running average rate of reward accrual changes. Further, the lower supply threshold may be adjusted based on predicted events which may impact a rate of reward accrual, such as a holiday, a sale, or other promotional offer or foreseeable event which may influence a rate of purchases made with a business, and therefore which may influence a rate of reward accrual and distribution At step 408, method 400 includes purchasing a number of whole shares by placing a buy order for a number of whole shares via an average price account (alternatively the buy order may be placed directly on the open market from the inventory account). The number of whole shares to be bought may be determined based on the extent to which the pre-purchased supply of shares is below the lower supply threshold, and may include placing a buy order for the minimum number of whole shares to bring the pre-purchased supply of shares above the lower supply threshold. As another example, the number of whole shares to be bought via the buy order may comprise the maximum number of whole shares, which may increase the pre-purchased supply of shares above the lower supply threshold, while not increasing the pre-purchased supply of shares above the upper supply threshold. As a specific example, based on an upper supply threshold of 10 shares of stock X, a lower supply threshold of 5 shares of stock X, and based on a supply of shares of 4.5 shares of stock X, the maximum number of whole shares to be bought may be 5.0 shares of stock X (resulting in the after buy pre-purchased supply of shares equaling 9.5 shares of stock X) while the minimum number of whole shares of stock X which may be bought may be 1.0 share of stock X (resulting in an after buy pre-purchased supply of shares equaling 5.5 shares of stock X). It will be understood that the number of whole shares of stock bought based on a pre-purchased supply of shares within an inventory account may comprise any number of whole shares which would result in an after buy pre-purchased supply of shares between the upper supply threshold and the lower supply threshold. Upon completion of the whole share buy at 406 method 400 may then end.

In this way, a method such as method 400 may enable substantially real time adjustment of pre-purchased supply of shares within an inventory account, to reduce a probability of fractional equity reward distribution delay, by incorporating both current reward distribution data, as well as predicted event data, when determining an upper supply threshold and a lower supply threshold.

Turning now to FIG. 5, an example method 500 for aggregating and executing user sell orders, which may comprise sell orders for fractional shares of stock. One or more of the steps of method 500 may be automatically executed by a loyalty platform, such as loyalty platform 108, configured with an equity allocation system, such as equity allocation system 120. Method 500 may enable user sell orders for fractional shares of stock to be rapidly executed, without the loyalty platform directly buying back fractional shares of stock from users. Conventionally, a difficulty of dealing in fractional shares of stock is that securities markets generally do not deal in fractional shares of stock, and therefore a user wishing to execute a sell order for an amount of fractional shares may be required to pay additional fees for such an order, or may simply be unable to complete such an order. Method 500 may mitigate this issue, without requiring the loyalty platform to directly purchase fractional shares of stock from its users.

Method 500 begins at 502, which includes aggregating user fractional sell orders. In one example, fractional sell orders may be computationally aggregated, such as by summing all pending user sell orders. Alternatively, user sell orders may be aggregated by transferring user equity to be sold to an account, such as the average price account, and pooling/aggregating the equity to be sold with the account. Upon placing a sell order, a user may receive a sell order status displayed via a display of a computing device associated with the user. The sell order status may indicate to the user the amount of equity to be sold, such as by rendering the amount within a graphical user interface, which may comprise an amount of fractional shares of stock, as well as an indication of what stage of the sell process the sell order is currently in. Method 500 may then proceed to 504.

At 504 method 500 includes evaluating if the aggregated fractional share sell order amount is greater than a sell order threshold. This evaluation may occur upon each new user sell order for a given stock. Alternatively, the evaluation may occur at regular, pre-determined intervals of time. The sell order threshold may be based on a rate of sell order aggregation, a time since placement of the oldest sell order in the aggregated sell order, and liquidity of the stock comprising the sell order (such as may be indicated by evaluating volume of trade on the open market for the stock). Alternatively, the sell order threshold may be a pre-determined value. The sell order threshold may be unique for each of the plurality of stocks used to reward users on the loyalty platform. As an example, the sell order threshold may comprise a whole number of shares, or alternatively the sell order threshold may comprise a fractional amount of shares. In one example, a default sell order threshold may be adjusted based on a duration of time since the oldest sell order in the aggregated sell order being evaluated was placed. In a specific example, a default threshold of 5.0 shares of stock may be decremented to 4.0 shares of stock based on the length of elapsed time since the first sell order within the aggregated sell order was placed surpassing a threshold. For example, a based on the oldest sell order within an aggregated sell order exceeding a threshold wait time of 1 day, a sell order threshold may be decreased. In this way, a duration of wait for execution of a user sell order may be reduced. In another example, a sell order threshold may comprise a predetermined whole number of shares, such as 1.0 shares. If at 504 the loyalty platform determines that the aggregated fractional share sell order amount is not greater than the sell order threshold, method 500 may return to 502, and continue to aggregate fractional share sell orders from the plurality of users. However, if at 504 it is determined that the aggregated fractional share sell order is greater than a sell order threshold, method 500 may proceed to 506.

At 506, method 500 includes liquidating a number of whole shares of the aggregated fractional share sell order. The number of whole shares liquidated from the aggregated fractional share sell order may be based on the amount of the aggregated fractional share sell order. In one example, the maximum number of whole shares within the aggregated fractional share sell order may be sold. As a specific example, based on an aggregated fractional share sell order amounting to 2.566 shares of stock X, a whole share sell order for 3.0 shares of stock X may be placed with a clearing system. Funds obtained from liquidating whole shares of stock comprised of a plurality of aggregated user fractional share sell orders may be allocated to the plurality of user accounts associated with the plurality of aggregated user fractional share sell orders. As an example, if user A placed a sell order for 0.5 shares of stock X, and user B placed a sell order for 0.5 shares of stock X, based on a liquidation threshold of 1.0 shares of stock X, a whole share sell order may be placed, and executed, for the 1.0 shares. Funds from the whole share sell for the 1.0 shares of stock X may be distributed to user accounts associated with user A and user B in proportion to the amount of the executed sell order comprising stock owned by that user, so in this case 50% of the funds go to an account belonging to user A, and 50% of the funds go to an account belonging to user B. Upon execution of the whole share sell order based on the aggregated fractional share sell orders, method 500 may then end.

In this way, sell orders for fractional shares of equity, which may conventionally require additional fees or time to sell, may be efficiently and timely sold, by aggregating fractional share sell orders from a plurality of users, and executing a whole share sell order based on the amount of the aggregated fractional share sell orders exceeding a sell order threshold.

Turning now to FIG. 6, an illustration of an example graphical user interface 600. Graphical user interface 600 may be displayed by the loyalty platform to a user via a display of a user computing device as part of one or more methods herein disclosed. In particular, graphical user interface 600 comprises an interface which may enable a user to initiate a process for linking a payment medium, such as a debit card or credit card, with a user account.

FIG. 7 shows one example of graphical user interface 700 comprising one or more equity reward statuses. The equity reward status may include an indication of a current step of a reward distribution process a pending fractional equity reward is currently in, and may be displayed to a user via a display of a computing system at any time, and any number of times. Equity reward statuses may be updated as the stage of reward distribution for a given fractional equity reward changes, such as when a tracked user loyalty purchase is first detected, when a buy order for an whole number of shares of stock based on the tracked user loyalty purchase is placed, and when a fractional share of stock based on the tracked user loyalty purchase is being transferred, such as from a pre-purchased supply of inventor to a user account. By providing equity reward statuses, such as those illustrated in graphical user interface 700, a user may be better informed regarding the progress of a reward distribution, and may therefore feel included within the distribution process, and less prone to frustration.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method comprising:
executing, with an equity allocation system of a loyalty platform comprising one or more computing systems, a whole share purchase of a number of whole shares of stock based on an aggregated dollar reward amount exceeding a pending reward threshold, wherein the equity allocation system directs an average price account of the loyalty platform to perform the whole share purchase from a clearing house, and wherein the aggregated dollar reward amount is an aggregation of a plurality of dollar reward amounts that is based on a plurality of tracked user loyalty purchases tracked automatically by the loyalty platform;
automatically adding, with the equity allocation system, the number of whole shares of the stock purchased in the whole share purchase to an inventory account to form a pre-purchased supply of shares of the stock;

automatically distributing, with the equity allocation system, a plurality of fractional share amounts to a plurality of user accounts from the pre-purchased supply of shares of the stock in the inventory account, wherein the plurality of fractional share amounts is based on an execution price of the whole share purchase and the plurality of dollar reward amounts;

adjusting, automatically with the equity allocation system, the pre-purchased supply of shares of the stock to maintain the pre-purchased supply between an upper supply threshold and a lower supply threshold that are each dynamically adjusted based at least on a running average rate of distribution of fractional share amounts of the stock by the loyalty platform, such that the upper supply threshold and the lower supply threshold each change as the running average rate changes; and automatically transmitting an equity reward status for display on one or more user computing devices associated with one or more of the plurality of tracked user loyalty purchases.

2. The method of claim 1, wherein executing the whole share purchase comprises placing a buy order for the number of whole shares of the stock, and wherein a monetary value of the number of whole shares of the stock is not less than the aggregated dollar reward amounts.

3. The method of claim 2, further comprising receiving the purchased number of whole shares of the stock within the inventory account, and adding the number of whole shares of the stock to the pre-purchased supply of shares.

4. The method of claim 3, wherein the stock is stock in a business, and the method further comprising charging the business based on the purchased number of whole shares of the stock.

5. The method of claim 1, wherein the plurality of tracked user loyalty purchases comprises a plurality of purchases conducted with payment media linked to one or more of the plurality of user accounts, and wherein the plurality of purchases is made to a business registered with the loyalty platform.

6. The method of claim 1, wherein the running average rate is a running average rate of distribution of fractional share amounts of the stock by the loyalty platform to user accounts from the pre-purchased supply of shares in the inventory account, and wherein the pre-purchased supply of shares of the stock is adjusted in real-time.

7. The method of claim 6, wherein the upper supply threshold and the lower supply threshold are further adjusted based on a predicted event.

8. A method for automatically distributing fractional equity rewards using a loyalty platform comprising one or more computing systems, the method comprising:

determining, with a purchase tracking module of the loyalty platform, a dollar reward amount for a user based on a tracked user loyalty purchase conducted by the user with a business;

automatically adjusting a pre-purchased supply of shares of stock in the business in an inventory account associated with the business to maintain the pre-purchased supply of shares of stock in the inventory account between an upper supply threshold and a lower supply threshold, each of the upper supply threshold and the lower supply threshold based on a running average rate of fractional equity reward distribution and one or more predicted events, such that the upper supply threshold and the lower supply threshold each change as the running average rate of fractional equity reward distribution changes, wherein an equity allocation system of the loyalty platform directs the inventory account and/or an average price account to buy or sell shares of stock via a clearing house to maintain the pre-purchased supply of shares of stock within the upper and lower supply thresholds;

automatically distributing, with the equity allocation system, a fractional share amount to an account of the user from the pre-purchased supply of shares of stock in the inventory account, wherein the equity allocation system directs the inventory account to distribute the fractional share amount to the account of the user, and wherein the fractional share amount is based at least in part on the dollar reward amount; and responsive to distributing the fractional share amount, automatically transmitting an updated equity reward status indicating a pending reward amount has been fulfilled for display to the user via a user device.

9. The method of claim 8, wherein the dollar reward amount comprises a pre-determined fraction of a monetary value of the tracked user loyalty purchase conducted by the user with the business.

10. The method of claim 8, wherein the updated equity reward status comprises one or more of a push notification, an email, and an SMS message.

11. The method of claim 8, wherein the pre-purchased supply of shares of stock is adjusted in real-time.

12. The method of claim 8, further comprising:
responding to the pre-purchased supply of shares of stock in the inventory account of the loyalty platform exceeding the upper supply threshold by:
placing a sell order for a portion of the pre-purchased supply of shares of stock using a clearing system.

13. The method of claim 8, further comprising:
responding to the pre-purchased supply of shares of stock in the inventory account of the loyalty platform decreasing to below the lower supply threshold by:
placing a buy order for a second number of whole shares of stock using a clearing system.

14. The method of claim 8, further comprising:
aggregating a plurality of equity sell orders from one or more users of the loyalty platform to form an aggregate sell order;
responding to the aggregate sell order exceeding a sell order threshold by:
placing a sell order for a second number of whole shares of the aggregate sell order, wherein the second number of whole shares is equal to or less than the aggregate sell order; and
responding to execution of the sell order by distributing proceeds of the sell order to user accounts of the one or more users of the loyalty platform.

15. A computing system comprising:
a processor;
a network adapter; and
a memory storing instructions executable by the processor to:
aggregate a plurality of dollar reward amounts earned by one or more users based on a plurality of tracked user loyalty purchases conducted with a business, to form an aggregated dollar reward amount;
transmit an equity reward status using the network adapter to one or more user computing devices associated with one or more of the plurality of tracked user loyalty purchases;

automatically execute a whole share purchase based on the aggregated dollar reward amount exceeding a pending reward threshold;

determine a plurality of fractional share amounts based on an execution price of the whole share purchase and the plurality of dollar reward amounts;

automatically distribute the plurality of fractional share amounts to a plurality of user accounts from a pre-purchased supply of shares of stock in an inventory account of a loyalty platform;

automatically determine if a whole share sell order or a whole share purchase order is to be placed, to adjust the pre-purchased supply of shares of stock based on an upper supply threshold and a lower supply threshold, wherein the upper supply threshold and the lower supply threshold are determined based on a running average rate of fractional equity reward distribution to user accounts from the pre-purchased supply of shares of stock in the inventory account, such that the upper supply threshold and the lower supply threshold each change as the running average rate of fractional equity reward distribution changes; and automatically transmit an updated equity reward status via the network adapter to the one or more user computing devices indicating distribution of the plurality of fractional share amounts is complete.

16. The computing system of claim 15, wherein the memory further stores instructions executable by the processor to:

adjust the upper supply threshold and the lower supply threshold in response to a predicted event.

17. The computing system of claim 15, wherein the equity reward status comprises an estimated reward fulfillment time, and wherein the estimated reward fulfillment time is determined based on a rolling average fulfillment time for previously distributed fractional equity rewards.

18. The computing system of claim 15, wherein the memory further stores instructions executable by the processor to:

respond to execution of the whole share purchase by:
charging the business based on a purchased number of whole shares.

* * * * *